United States Patent [19]
Crump

[11] Patent Number: 5,880,961
[45] Date of Patent: Mar. 9, 1999

[54] APPARARUS AND METHOD FOR CREATING THREE-DIMENSIONAL MODELING DATA FROM AN OBJECT

[76] Inventor: Craig D. Crump, 8383 Red Rock Rd., Eden Prairie, Minn. 55347

[21] Appl. No.: 638,915

[22] Filed: Apr. 25, 1996

Related U.S. Application Data

[63] Continuation-in-part of Ser. No. 284,253, Aug. 2, 1994, Pat. No. 5,621,648.

[51] Int. Cl.⁶ .................................................. G06F 19/00
[52] U.S. Cl. ................................ 364/468.19; 364/468.26
[58] Field of Search ...................... 369/468.26, 468.27, 369/468.24, 468.25, 468.21, 468.19, 468.2, 474.24, 474.34, 474.05; 356/376–379, 382–385; 264/40.1–40.7, 401, 406, 101, 571, 138, 139, 271.1, 272.13; 425/149, 169, 170; 395/119, 120

[56] References Cited

U.S. PATENT DOCUMENTS

| | | | |
|---|---|---|---|
| 5,019,993 | 5/1991 | Montalcini et al. | 364/474.03 |
| 5,107,444 | 4/1992 | Wu | 395/119 |
| 5,113,490 | 5/1992 | Winget | 395/119 |
| 5,139,338 | 8/1992 | Pomerantz et al. | 356/376 |
| 5,172,326 | 12/1992 | Campbell, Jr. et al. | 364/470 |
| 5,239,591 | 8/1993 | Ranganath | 382/6 |
| 5,276,783 | 1/1994 | Fossum | 395/123 |
| 5,309,366 | 5/1994 | Grenkowitz | 364/474.24 |

OTHER PUBLICATIONS

Little, et al—"The Industrial Computed Tomography cell"—*The Leading Edge*, Winter 1989/1990 pp. 10–15.

*Primary Examiner*—Joseph Ruggiero
*Attorney, Agent, or Firm*—Moore & Hansen

[57] ABSTRACT

A method and apparatus for the creation of a electronic domain geometric modeling data file containing internal and external features of an object of interest by first successively removing contours of material forming the object to form exposed surfaces and thereby reveal the internal and external features contour by contour and second by subsequently, successively acquiring data relative to the exposed surfaces is provided. The geometry of each exposed surface is obtained, processed and recorded after each contour is removed. The processing is converted to perimeter data to define the internal and external features and surfaces of the object and the perimeter data is combined to yield a three dimensional electronic domain representation of the object. If desired this representation can be displayed on a computer monitor or printed onto paper. In a representative embodiment of the present invention a face mill is provided to remove the contours, a scanner is used to obtain the data relative to the exposed surfaces, and a shuttle is used to transport the object between the mill and the scanner for alternating steps of material removal and scanning.

18 Claims, 20 Drawing Sheets

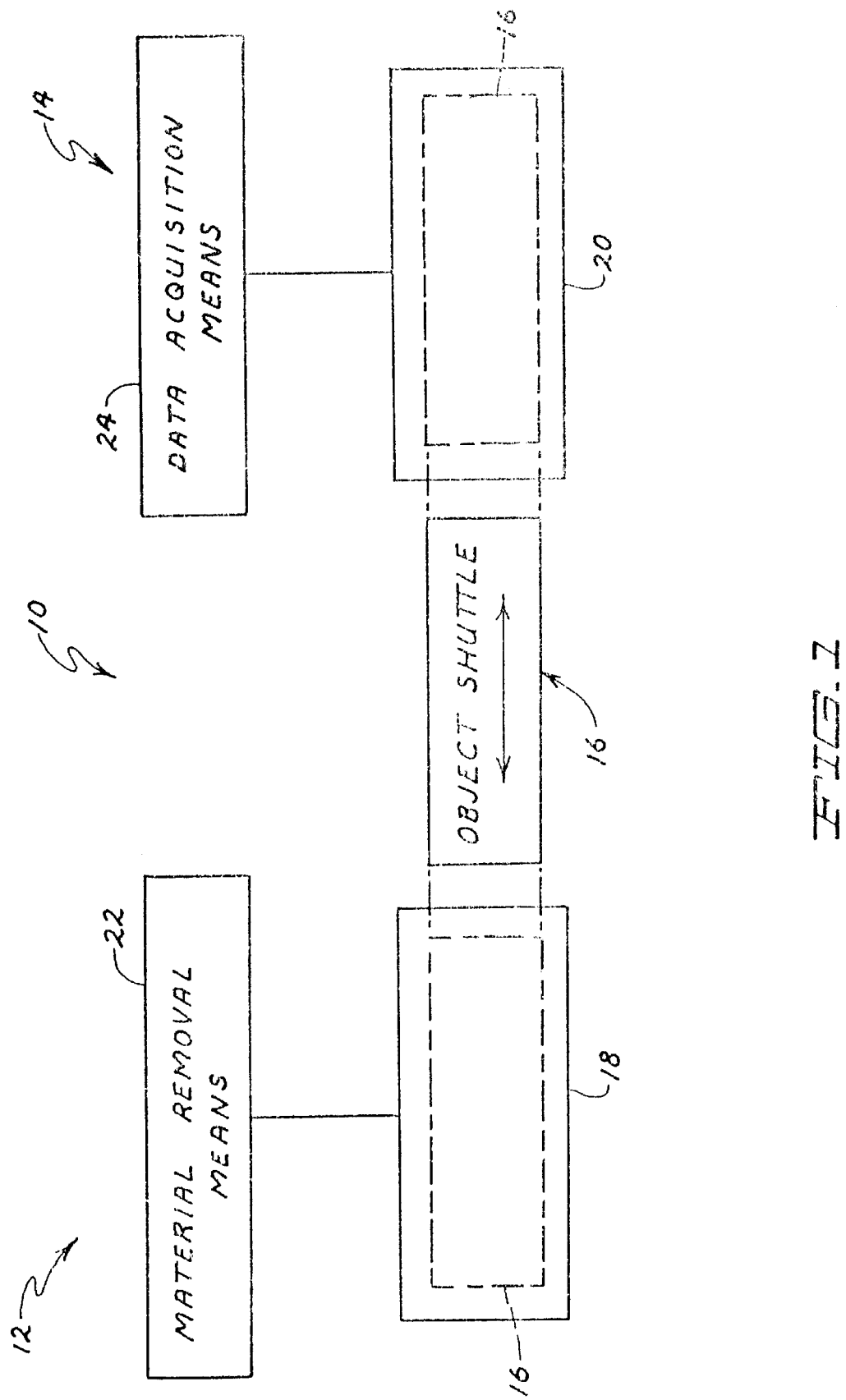

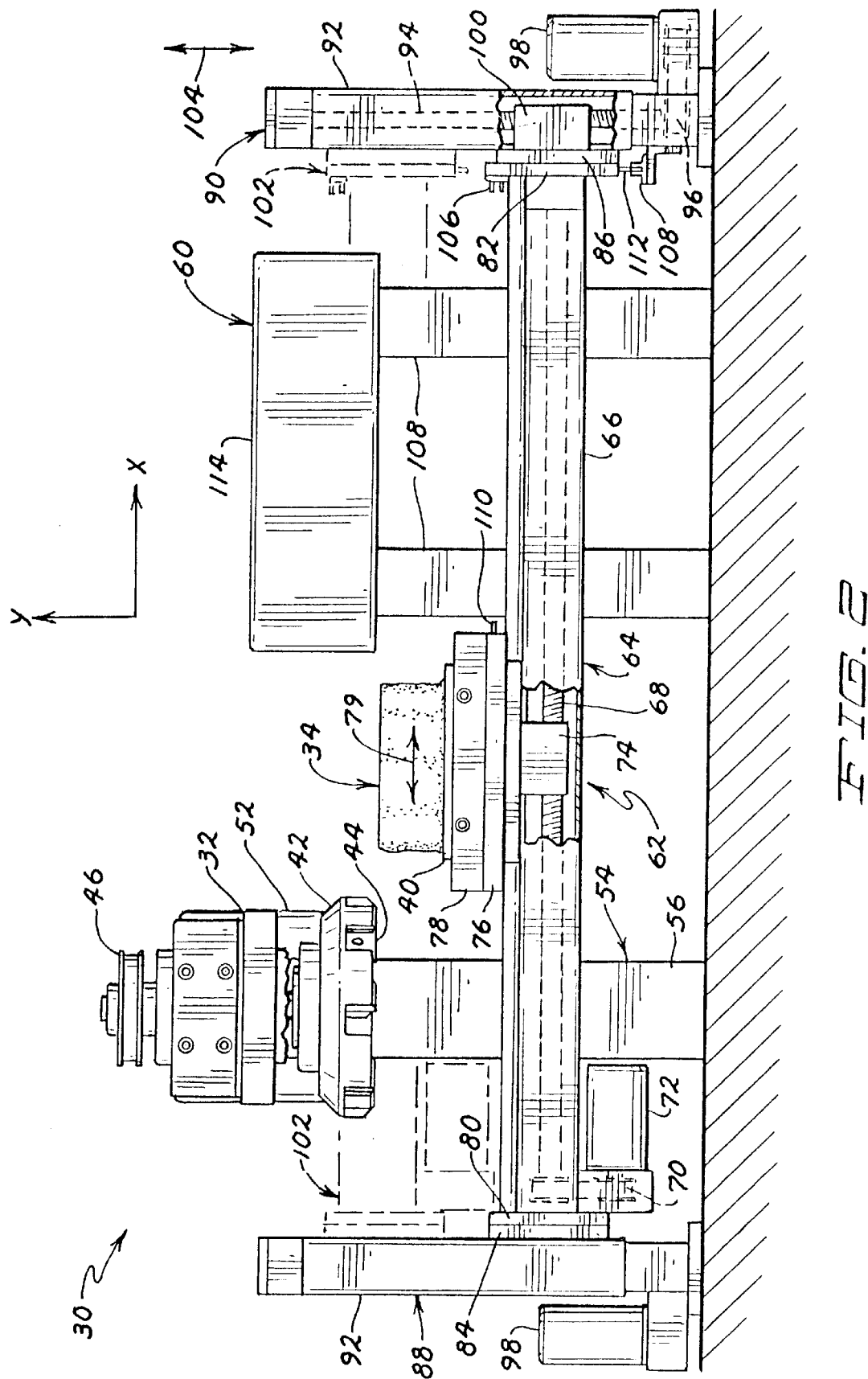

APPARARUS AND METHOD FOR CREATING THREE-DIMENSIONAL MODELING DATA FROM AN OBJECT

This application is a continuation-in-part of application Ser. No. 08/284,253, filed Aug. 2, 1994, now U.S. Pat. No. 5,621,648.

FIELD OF THE INVENTION

The present invention relates in general to method and apparatus for producing an electronic representation of an object. In particular, the present invention relates to an apparatus and a method for selective destruction of an object and its reproduction in computer memory and associated displays as well as in a hard copy form, such as paper.

BACKGROUND OF THE PRESENT INVENTION

There exist known methods for producing three dimensional images in an electronic domain from solid physical objects. Typically, these methods involve some form of data acquisition of information relative to the exterior surfaces of the object, either by contact or non-contact means. The result is a computer generated image of the exterior surface of the object. For example, one such method involves physical contact coordinate measuring methods. This particular method can produce accurate physical part dimensions, but is deficient because it is time consuming to use because of the amount of data generated and because it cannot readily secure interior features of the object. Non-contact methods such as laser scanning are also capable of creating accurate part dimensions, but like the coordinate measuring methods are not readily capable of capturing internal part features. Interior features, such as surface geometries and structural elements cannot readily be captured by these methods and so they are of limited use.

There do exist methods and apparatus for capturing both internal and external features of a physical object. This is a desired and sought after ability both from the stand point of quality control of manufactured parts and because of the desire to be able to reverse engineer objects. Among the methods utilized for these ends are the non-destructive techniques of ultrasound imaging and computed tomography (CT). Ultrasound imaging is generally not accurate for reproducing physical measurements with the desired accuracy. While CT can produce modeling data of the desired accuracy, the equipment used to perform this type of operation or inspection is often quite expensive, with costs for the x-ray producing equipment, the housing for the equipment, the sensors for detecting the x-rays, and the computer resources necessary to operate the CT system often raising the cost to a figure in the one million dollar range. In addition, CT presents a radiation hazard and requires special facilities to use this equipment, which adds to the cost of their acquisition and use. Known methods of quality control and reverse engineering can also require substantial time investments in terms of human time and central processing unit or computer time. A need exists to reduce the time, cost, and repeatability of quality control sampling and to provide manufacturers a way to reliably and accurately reverse engineer an object.

Certain destructive techniques for capturing both internal and external features of a physical object also exist. One of these is disclosed in commonly owned co-pending application Ser. No. 08/284,253, filed Aug. 2, 1994, now U.S. Pat. No. 5,621,648. Another destructive method and apparatus for capturing the internal and external features of a physical object is disclosed in U.S. Pat. No. 5,139,338 which issued to Pomerantz et al. Aug. 18, 1992. Pomerantz discloses apparatus for filling internal cavities in a three-dimensional object and filling the area outside of an object with a support material solidified to a solid block. Following such solidification, a layer of the entire solid block is removed to allow capture of the features of the exposed surface. The support material of Pomerantz is required to have generally the same hardness as that of the object to be analyzed. Further, internal voids in the solidified material are required to be manually filled by first locating the voids and then filling the same in a second step process of encasing the material. This second process requires that the voids first be located before they can be filled. Such a step of location requires further effort such as using non-destructive techniques to locate voids. As has been described, the use of such methods and apparatus for determining internal features is costly and potentially dangerous. Pomerantz contains no accurate method or apparatus for locating and filling voids that may exist within the interior structure of the part to be analyzed.

The existence of voids with the interior features of an object to be analyzed can be extremely detrimental to the accuracy of the representation obtained by the apparatus and process. This is especially true if the voids within the interior features of the object are adjacent to those interior features. In such an instance, a void adjacent a surface internal to the object will create an inaccurate representation of the interior features of the object, and render the representation virtually useless, especially for re-creation of a similar part. A void of filler material adjacent an interior feature of the object to be analyzed will appear to be a part of the object, and therefore render the dimensions obtained from the analysis inaccurate.

It would be desirable to have an apparatus and process for removing voids within the interior filler material of an object to be analyzed, especially voids adjacent an internal surface area of the object, without undo expense or risk.

Presently, various methods exist for the placement of an object to be analyzed so as to allow the introduction of a filler material into the interior and around the exterior of the object. Commonly, a base platform or plate has been used, on which the object is placed. In Pomerantz, for example, the object is aligned on the base and positioned so that it sits upright. Objects may also be suspended above the plate so that the filling material can completely encase the exterior surface of the object. When the encasing material cures, it heats up, also heating the part to be analyzed. When the part heats up, it expands, and has a strong tendency to be forced out of the encasing material. Expansion and contraction of the part creates large forces that the encasing material is incapable of containing.

The advent of the computer and computer aided design (CAD) and computer aided manufacture (CAM) has greatly assisted and expedited the work of the engineer and draftsman in designing, drawing, and manufacturing objects of all kinds. These computer aided engineering tools have made it possible to design a part and manufacture it without ever going through the prototype development stage. The electronic data representing the drawings of these parts are retained in some form of memory, thereby allowing their subsequent access by interested parties. Many parts currently manufactured and sold as well as entire products are made from engineering drawings that were created before the beginning of the CAD/CAM era. Some of these drawings have disappeared or been destroyed and there is a desire to bring these parts and products into the CAD environment.

It would be desirable to have an apparatus and process for taking an existing object and reproducing it in an electronic medium, thereby allowing pre-CAD/CAM era objects to be incorporated into the electronic environment, for providing a less costly alternative quality control inspection method than is presently available, for reducing manufacturing costs and speeding products to market, and for enabling an object to be accurately and quickly reverse engineered.

SUMMARY OF THE INVENTION

It is an object of the present invention to provide new and improved apparatus that is not subject to the foregoing disadvantages.

It is another object of the present invention to provide method and apparatus for selective removal of predetermined contours of material from an object of interest to expose a surface of interest.

It is still another object of the present invention to provide method and apparatus for acquiring data relative to each successively exposed surface of interest.

It is yet another object of the present invention to provide method and apparatus for manipulation of the data relative to a plurality of exposed surfaces of interest to produce a three dimensional electronic representation of the object of interest for display on a computer monitor, for printing on paper, or for other desired uses.

It is still yet another object of the present invention to provide method and apparatus for manipulation of the data relative to a plurality of exposed surfaces of interest to produce a surface three dimensional electronic representation of the object of interest for display on a computer monitor, for printing on paper, or for other desired uses.

It is another object of the present invention to provide method and apparatus for manipulation of the data relative to a plurality of exposed surfaces of interest to produce a solid three dimensional electronic representation of the object of interest for display on a computer monitor, for printing on paper, or for other desired uses.

It is still another object of the present invention to provide method and apparatus for acquiring data relative to an object of interest to provide quality control data for the manufacturer of the object.

It is still yet another object of the present invention to provide method and apparatus for substantial elimination of voids within an encasing material and to provide a more accurate representation of the internal features of an object to be analyzed.

The foregoing objects of the present invention are provided by an apparatus and method for producing three dimensional geometrical modeling data of an object of interest. The present invention includes means for selectively removing a predetermined contour of material from the object to produce an exposed surface of interest, apparatus for acquiring data representative of the exposed surface of interest, such as by scanning the exposed surface of interest, a shuttle for providing relative movement of the object between the material removal means and the data acquisition means, and data processing means for converting the acquired data into three dimensional modeling data. In accord with the present invention the material removal means may be a face mill. A process for producing the three dimensional geometrical data may include the steps of encasing the object within a machinable encasing material to form an encasement; orienting the encasement at a desired orientation relative to the material removal means; selectively and repeatedly removing a predetermined contour of a predetermined thickness from the object to produce an exposed surface of interest; acquiring data relative to selected exposed surfaces; converting the exposed surface data into perimeter data representative of the surface features at the selected exposed surfaces, both internal and external, of the object; importing the perimeter data into CAD space; and lofting surfaces on the perimeter data to provide a three dimensional surface model of the object. In an alternative embodiment, the exposed surface data can be converted into surface data that can be imported into CAD space and converted into a three dimensional solid model of the object.

To substantially eliminate internal voids in the encasement material, the encasement material may be cured in a series of cycles of alternating high and low pressure for a predetermined period, followed by a curing at high pressure for another pre-determined period. The alternating high and low pressure serves to destroy air bubbles or voids within the encasement material, especially those present adjacent the interior surfaces of the object to be analyzed, and provides a more accurate and precise representation of the interior features of the object.

A computer control program for initiating the filling of the mold with an encasement material, the alternating of high and low pressure cycles in the vacuum chamber, and the acquisition and analysis of encasement layers is also provided. The computer control program may be used to set the cycles for high and low pressure, as well as final curing, resolution of encasement material slices, and generation of output file for the generation of a point cloud representation of the physical object.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figures 1, 7A:
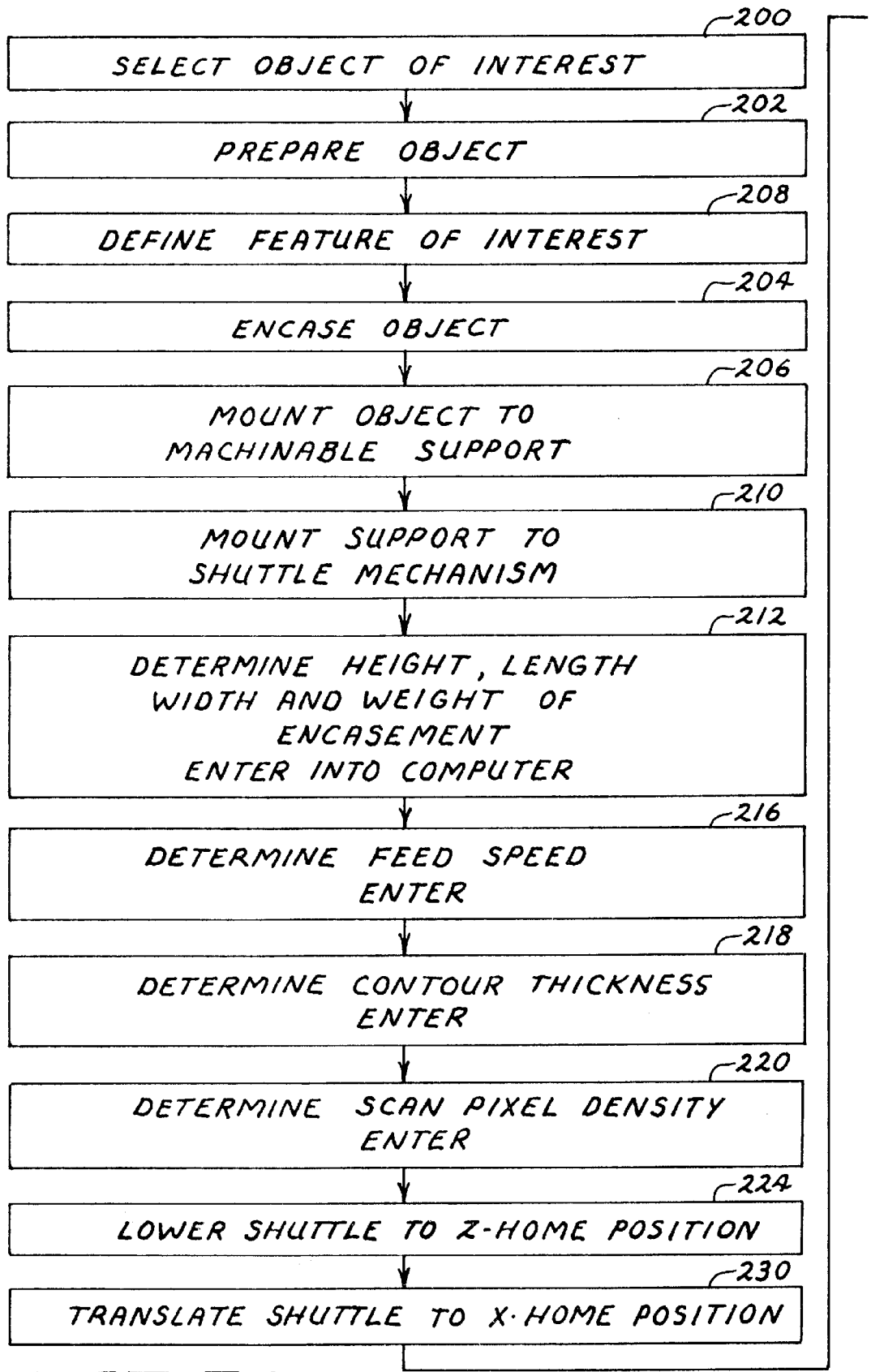
FIG. 1 is a box diagram illustrating the present invention in its most simple conceptual embodiment.
FIG. 7A, shown on two sheets as FIGS. 7A-1 and 7A-2, is a flow chart illustrating the operation of the embodiment shown in FIG. 2.

Referring to FIG. 1, the present invention is represented in its broadest form. Thus, FIG. 1 illustrates an apparatus 10 for creating three-dimensional modeling data from an object. Apparatus 10 includes a material removal station 12, a data acquisition station 14, and a shuttle 16 providing relative movement of the object of interest to be modeled between a first position 18 at the material removal station 12 and a second position 20 at the data acquisition station 14. It will be understood that the stations 12 and 14 could be moved relative to the object to be modeled and that the present invention contemplates either form of relative motion.

The material removal station 12 will include a material removal means 22 that selectively and repeatedly removes a predetermined contour of material from the object of interest to expose a surface of interest. Means 22 could include any of a variety of milling or machining tools, electro-discharge machining (EDM), electrochemical machining (ECM), lasers, or any other equivalent device or method suitable and appropriate for removing the type of material of which the object of interest is made. Means 22 will remove a predetermined contour having length, width, and thickness and geometry. The length and width of the contour and the exposed surface will vary depending upon the object geometry. For most applications, such as that illustrated herein, a uniform thickness of material will be removed; however, the present invention contemplates removal of a varying thickness of material within each contour. Furthermore, for most applications, including that illustrated herein, after the removal of each contour, the object of interest will have an exposed surface of interest that is substantially planar and lies substantially parallel to the previously exposed surface of interest. The present invention contemplates, however, the removal of contours where the exposed surface has a configuration other than substantially planar.

Data acquisition station 14 includes a data acquisition means 24 for acquiring data related to the exposed surface of interest and will include means, such as a personal computer (not shown in FIG. 1), for example, for storing the acquired data and manipulating the data to provide a three dimensional representation of the object in CAD space. Means 24 may include a scanner, for example, that scans the exposed surface of interest to create a computer graphic file of the exposed surface. This file along with others of the subsequently imaged exposed surfaces will be manipulated in a manner to be described below to produce the desired model in computer memory for display on a computer monitor, for printing a hard copy of the object of interest on paper, or for other desired end uses of the user.

Figure 3:
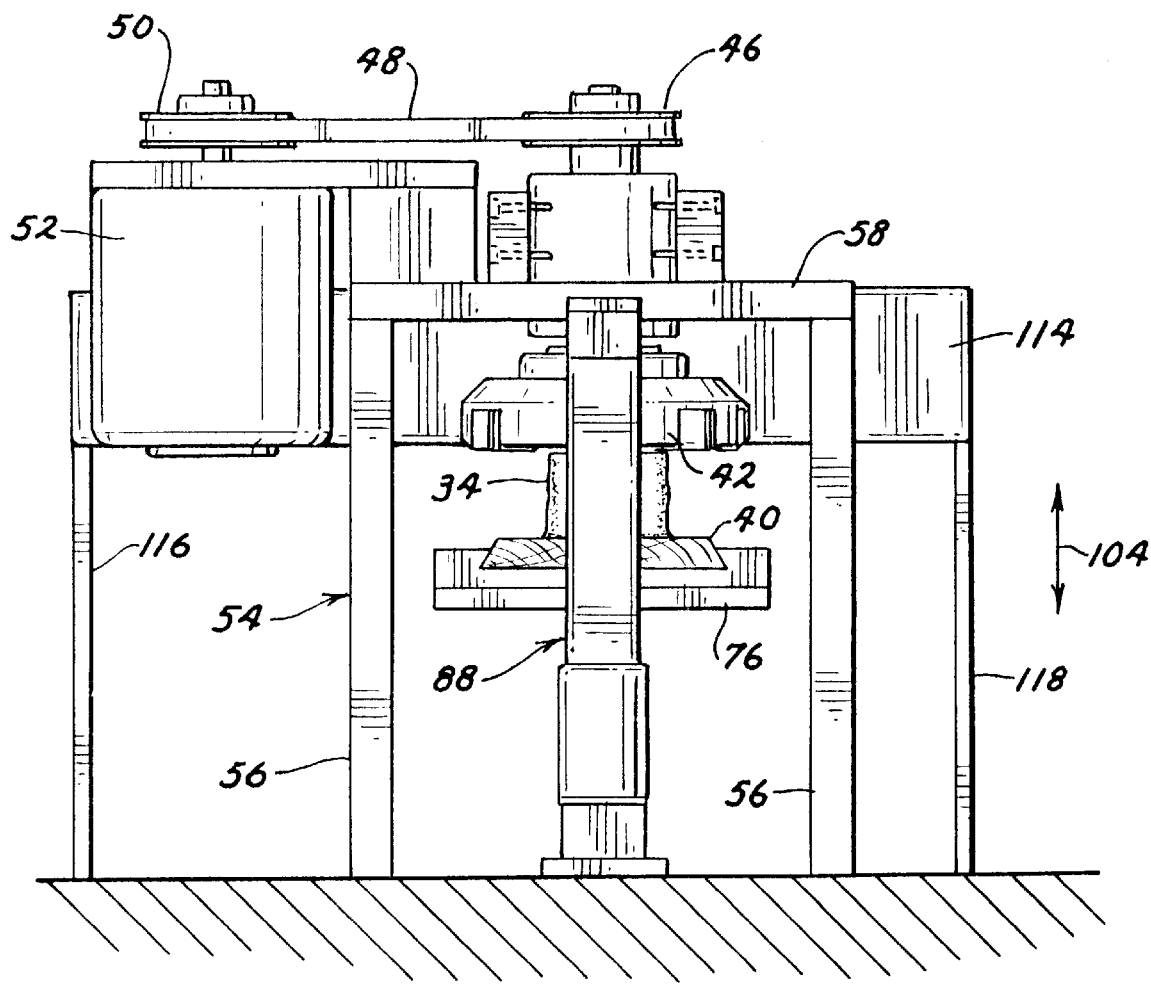
FIG. 3 is an end elevation view of the embodiment shown in FIG. 2.
Figure 4:
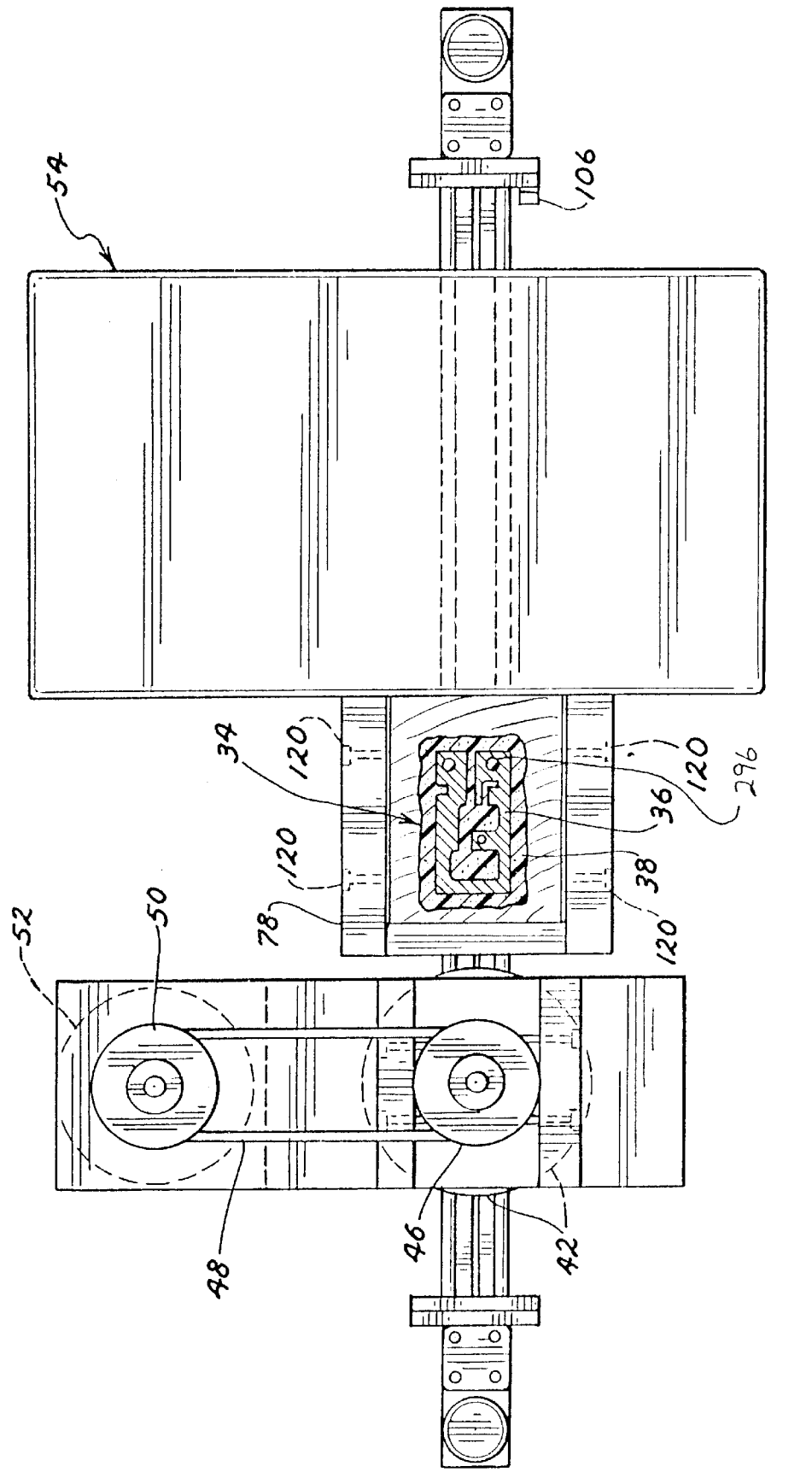
FIG. 4 is a top elevation view of the embodiment shown in FIG. 1.
Figure 6:
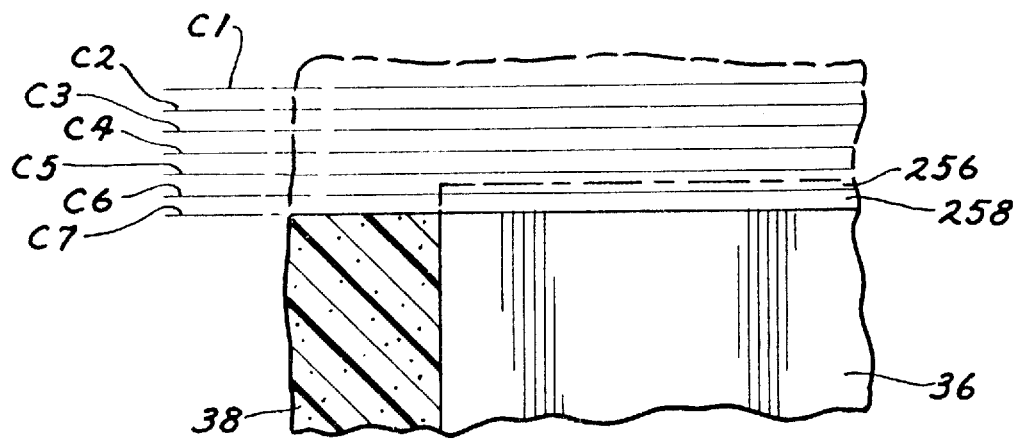
FIG. 6 is a partial cross sectional view of the encasement shown in FIG. 5 taken along cutting plane 6—6 of FIG. 5.
Figures 2, 7A:
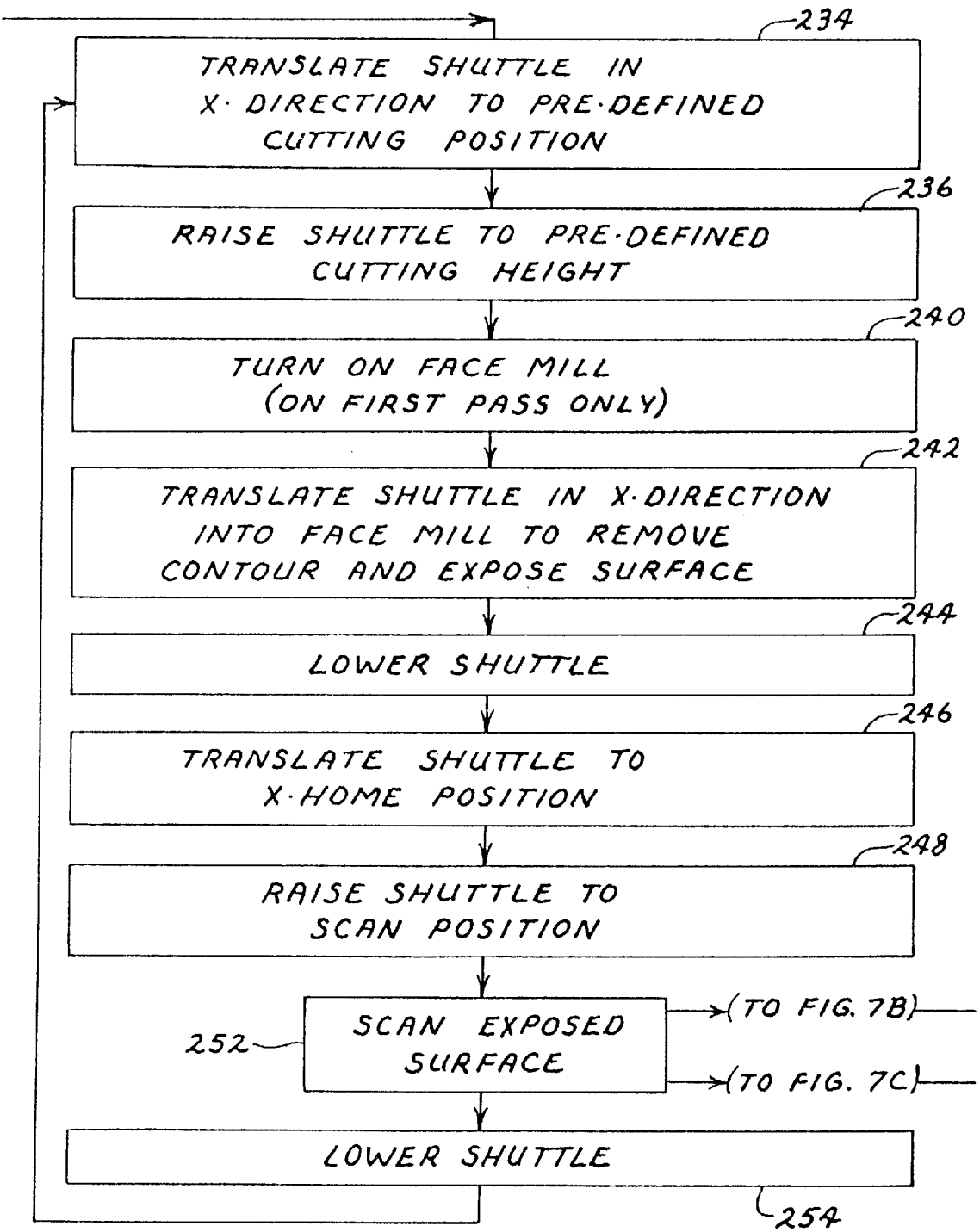
FIG. 2 is a side elevation view of an embodiment of the present invention.

Referring now to FIGS. 2–4, an embodiment of the present invention will be described. It will be understood that the embodiment shown in these Figures would have the necessary guards and surrounding housing to make the operation to be described below safe and efficient and that these items have been omitted for the sake of clarity in describing and illustrating the present invention. Thus an apparatus 30 in accord with the present invention may include a face mill 32 for selectively removing predetermined contours of material from an encasement 34. Encasement 34 includes an object of interest 36 (FIGS. 5 and 6) enveloped or encased within a machinable material 38. Machinable material 38 may be any material suitable for anchoring the object 36 to a machinable support 40. Thus, material 38 may be an epoxy-type of material and support 40 may be a wooden, plastic, or similar block. Mill 32 includes a cutting head 42 having a plurality of replaceable cutting inserts 44, only one of which is shown for clarity, for removal of a contour of material from the encasement 34. Cutting head 42 is rotated by means of a pulley 46 that is driven by a belt 48 extending between it and another pulley 50 rotationally driven by a motor 52. Mill 32 may be of the type manufactured and sold by Sumitomo-Electric. Such a mill can rotate the cutting head 44 at sufficient speeds to cut hard metals, such as steel, and is also capable of cutting materials such as plastic. Mill 32 will be positioned such that cutting head 42 is disposed in an elevated position relative to encasement 34 by a mill support 54 comprising a pair of spaced apart upright legs 56 and a horizontal support 58, which is broken away for clarity of illustration in FIG. 2. As previously noted, for most applications, herein, after the removal of each contour, the object of interest will have an exposed surface of interest that is substantially planar and lies substantially parallel to the previously exposed surface of interest. The exposed surface need not be planar however. For example, feeding the encasement 34 into the face mill 32 at an angle to the plane of cutting head 42 will create an elliptically shaped exposed surface in the encasement. This exposed surface can then be imaged by known means and the images analyzed and processed in accord with the present invention. The material could also be removed in cylindrical layers, such as by a lathe, or in spherical shells. The exact geometric shape of the removed material can be taken into account by the appropriate software.

The table or platform 40 on which the encased object 36 sits may also be constructed of a thermally conductive material. It has been found that a thermally conductive table or base 40 upon which the encased object 36 sits may be preferable in that it helps to eliminate potentially serious problems having to do with the expansion and contraction as the encasing material 38 hardens.

Figure 19:
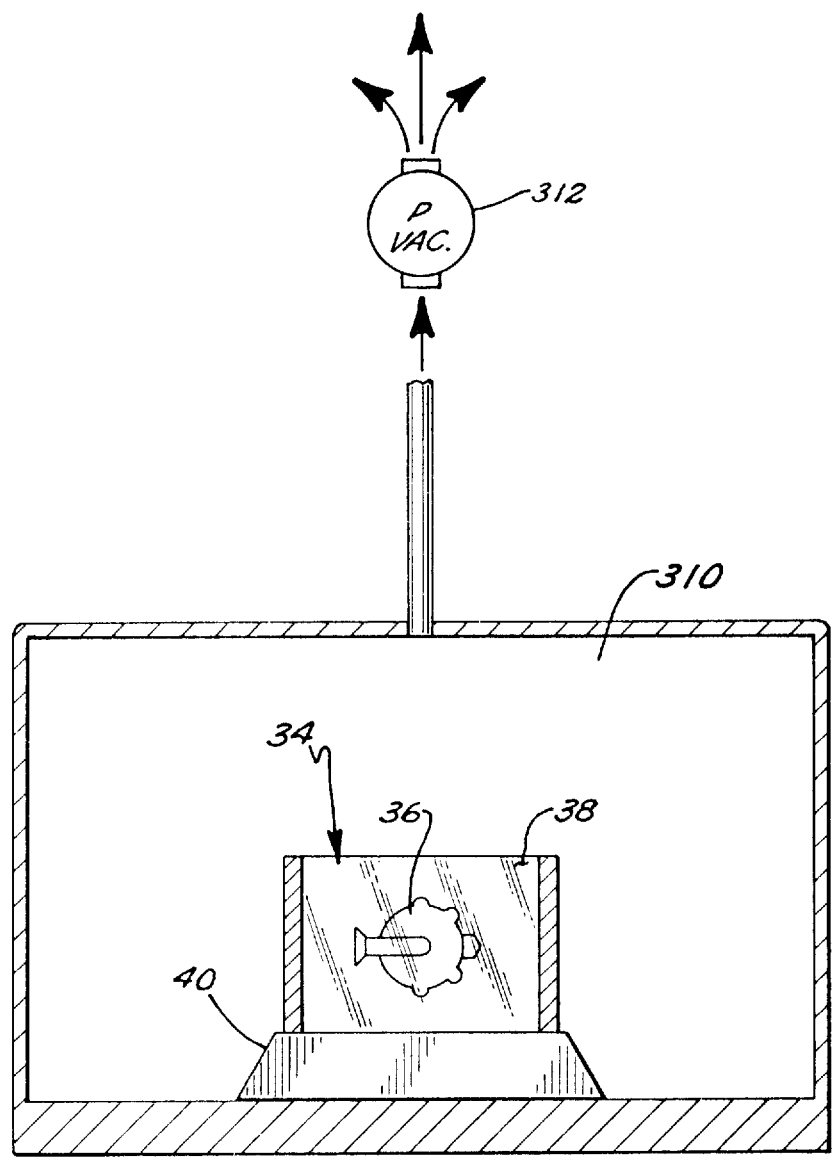
FIG. 19 is a view of a vacuum chamber with an encased object shown therein.

When the encasing material 38 hardens, it heats up. When the material heats up, heat is transferred to the encased object 36. The object expands from the increased heat, and may be likely to be forced from the encasing material 38 by expansion forces. The thermally conductive platform or table 40 on which the encasement 34 sits will serve to conduct some of the curing heat of the encasing material 38 away from the object 36 so that the object 36 is not subject to forces as strong as those encountered with wooden or plastic platforms 40. The thermally conductive platform 40 is preferably metal, which will serve to conduct heat away from the hardening encasing material 38. The thermally conductive platform 40 is shown in FIG. 19.

Apparatus 30 will also include a data acquisition station 60 and a shuttle mechanism 62. Shuttle mechanism 62, to be described immediately hence, transports encasement 34 between the face mill 32 and the data acquisition station 60 as well as provides motion perpendicular thereto. Stated otherwise, shuttle mechanism 62 is capable of moving encasement in the x and z directions, where movement in the x direction is a horizontal movement and movement in the z direction is a vertical motion perpendicular to the x direction of motion. It will be understood that shuttle mechanisms other than that to be described below are commercially available for providing motion to a carriage in two orthogonal directions and that the present invention contemplates their use in accord therewith.

To provide x or horizontal direction motion between the face mill 32 and the data acquisition station 60 a rodless cylinder 64 may be advantageously utilized. Rodless cylinder 64 may be of the type manufactured by Industrial Devices Corporation of Novato, Calif. As best seen in FIG. 2, rodless cylinder 64 includes a housing 66 and a screw 68 extending therethrough. Screw 68 is mounted at each end by appropriate bearings (not shown) and is rotationally driven by a power transmission linkage 70, such as through an appropriate timing belt or gear arrangement, by a motor 72. A nut 74 threadably receives the screw 68 and travels in the x direction as the screw 68 is rotated. A carriage 76 is attached to the nut 74 by known means such as threaded fasteners and nuts and a mounting block 78 is in turn attached to the shuttle table 76 by known means such as threaded fasteners and nuts. The encasement 34 is attached in any known manner, such as bolting, to the mounting block 78. As screw 68 is rotationally driven by the motor 72, therefore, nut 74 and consequently encasement 34 will travel in a horizontal or x direction between the face mill 32 and the data acquisition station 60 as indicated by double-headed arrow 79.

To provide motion in the z or vertical direction, rodless cylinder 64 is attached at its ends 80, 82 to carriages 84, 86 respectively, each of which in turn forms part of an upright oriented rodless cylinder 88, 90, respectively. In this manner rodless cylinder 64 functions as a frame to support the shuttle table 76, the mounting machinable block 78 and the attached encasement 34 during the vertical motion. Rodless cylinders 88 and 90 are similar to rodless cylinder 64 and may also be of the type manufactured by Industrial Devices Corporation of Novato, California. Because of their similarity, only rodless cylinder 90 will be described further. Thus, rodless cylinder 90 also includes a housing 92 and a screw 94 rotationally mounted by appropriate bearings (not shown) and extending therethrough. The screw 94 is rotationally driven by a power transmission linkage 96, such as through an appropriate timing belt or gear arrangement, by a motor 98. A nut 100 threadably receives the screw 94 and is attached by known means such as threaded fasteners and bolts to carriage 86. Thus, as seen in FIG. 2, as screws 94 are rotationally driven by motors 98, nuts 100 will be raised or lowered in the vertical or upright direction, thereby carrying rodless cylinder 64 therewith through its attachments to carriages 84 and 86. Rodless cylinder 64 may be moved from its position shown in FIG. 1 to the position 102 shown in phantom outline as the material removal operation proceeds as indicated by double-headed arrow 104. The motions of the rodless cylinders 88, 90 will be appropriately coordinated so as to ensure that the rodless cylinder 64 is lifted uniformly at its ends, thereby further ensuring that encasement 34 will be fed into the cutting head 42 at the same angle with each successive pass. This method of operation simplifies the data acquisition and processing but is not critical to the present invention since contours of varying geometries, including thicknesses can be removed so long as the data processing means is appropriately programmed to address these geometry changes.

Shuttle mechanism 62 also includes an x-motion sensor 106 and a z-motion sensor 108 and respective flags 110 and 112. Sensors 106 and 108 may be any known type of sensor, such as an infrared photo-Darlington type of sensor. These sensors aid in the control of the motion of the shuttle table 76 by relaying a signal to a control means, such as a computer, when the motion of the shuttle 62 reaches its a predefined position, as will be explained in greater detail below.

Data acquisition station 60 includes a data acquisition device 114 supported in an elevated position above rodless cylinder 64 by two pairs of spaced apart support legs 116, 118. Device 114 may be a scanner of the type manufactured by UMAX Data Systems, Inc. This type of scanner is capable of achieving a resolution of 1200 dots per inch, which will normally be beyond the resolution (less than 0.001 inch) necessary for achieving the desired accuracy in object dimensions. While this resolution or even greater resolutions can be utilized, in most applications this will simply increase the data processing time with little or no real gain in object dimension accuracy.

Figure 5:
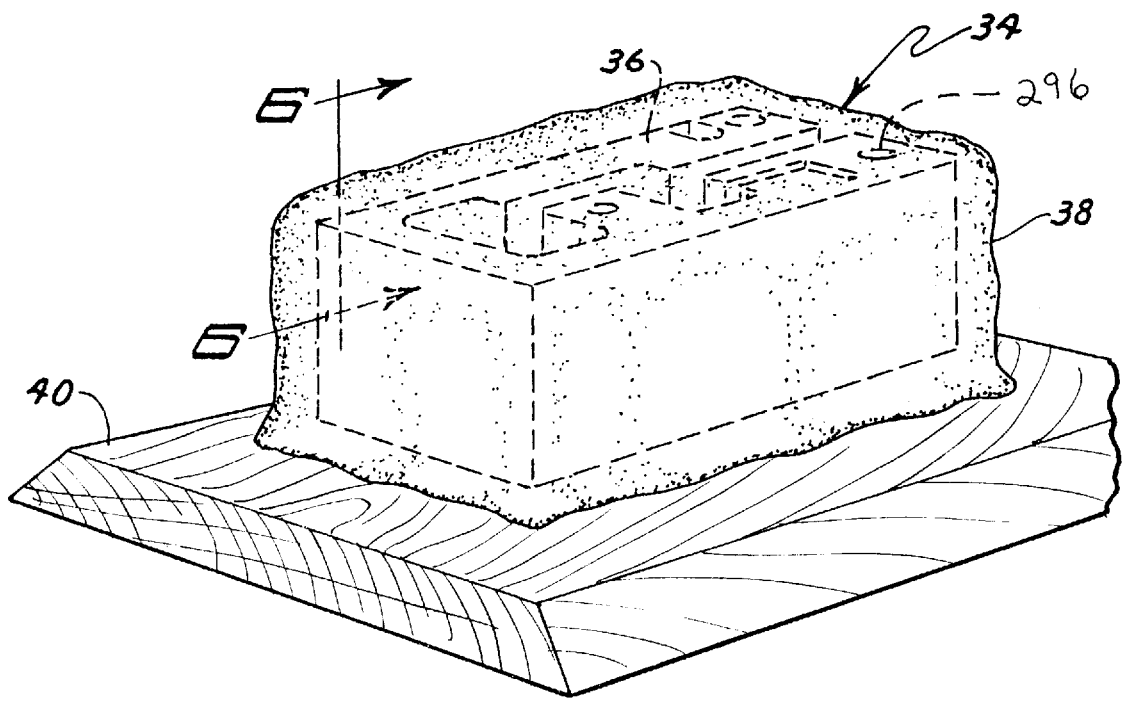
FIG. 5 is an illustrative example of a representative object that could be electronically reproduced in accord with the current invention and shows the object mounted to a machinable support and encased within an encasing material to form a machinable encasement.

Referring now to FIGS. 5 and 6, an object 36 is shown encased within an encasing material 38 to form an encasement 34. With some objects it may not be necessary to completely encase the object such as that shown in the Figures. It is generally desirable to do so, however, for several reasons. First, where an object may have features such as a depending flange or other member, that is, stalactite-like features, as the object has material contours removed by the face mill 32 the flange or other depending member will be left without any support and will become separated from the remaining portion of the object unless some support is provided for it, a function satisfied by the encasing material.

Secondly, the encasing material, which is applied so as to completely fill any internal volumes, supports all of the surfaces during machining, milling, or material removal operations and thereby inhibits the formation of burrs on the edges of the object as the contours are removed.

Third, by appropriately selecting an encasing material such that it has a different color or shade of gray from that of the exposed surface of interest, the scanner and thus the computer later manipulating the data is provided with a contrast between the exposed surface of the encasing material and the exposed surface of interest that facilitates the data manipulations that occur later in the process. Stated otherwise, proper selection of the encasing material provides a high visual contrast between the object surface and the encasing material surface which enables a line of demarcation to be determined between the surfaces.

Preferably the encasing material will have a reflectance that is substantially different from that of the exposed surface of interest, thereby providing the high contrast. The normal reflectance of a surface "is a measure of the relative brightness of the surface when viewed and illuminated vertically. Such measurements are referred to as a 'perfectly white Lambert surface'—a surface which absorbs no light, and scatters the incident energy isotropically—and are usually approximated by magnesium oxide (MgO) or some other bright powder." *McGraw-Hill Concise Encyclopedia of Science and Technology* ©1984, page 49. The ratio of the normal reflectance of the exposed surface of interest $R_o$ to that of the normal reflectance of the encasing material $R_e$ should be such that the ratio $R_o/R_e$ is as great as possible as a rule. For example, when aluminum is milled by a face mill, a shiny, silvery exposed surface is produced. An encasing material such as a black epoxy mixture is advantageously used to form the encasement since this encasing material will provide a dark exposed surface when machined, thereby providing a high contrast with the exposed aluminum surface. The high contrast increases the sharpness of the image scanned because the perimeter of the object of interest is more sharply defined relative to the encasing material.

Finally, the use of an epoxy or epoxy-like material as an encasing material provides a simple and rapid method of attaching the object 36 to the machinable support 40.

OPERATION OF THE PRESENT INVENTION

With the foregoing description in mind, the operation of the apparatus 30 in accord with the present invention can be described with reference to the Figures, and particular FIGS. 7–8. The general operation of the present invention will be first explained with reference to FIGS. 7A-1 and 7A-2. The conversion of the acquired data into a surface model will then be explained with reference to FIG. 7B. Finally, a discussion of the conversion of the data relative to FIG. 7C will be undertaken. First, an object of interest whose internal and external geometry is desired to be reproduced in an electronic medium is selected as indicated at 200. The object of interest is appropriately cleaned as indicated at 202 and then encased in the preselected encasing material as indicated at 204 to form the encasement 34. The encasement 34 can then be mounted to the support 40 as indicated at 206. As previously discussed, the encasing material can also serve to mount the object 36 to the support 40, in which case steps 204 and 206 are combined into a single step. The encasing step, whether separate or joined with the mounting step, should be accomplished such that the encasing material fills all internal volumes of the object of interest and engages all surfaces, internal or external thereof, thereby forming the encasement 34. The encasement process will be discussed further below. As will also be discussed further below, at this time if there is a particular feature of interest in the object, it should be identified as indicated at 208 in phantom since it may be desirable to select a particular orientation of the object on the support so that the feature of interest is disposed at a predetermined orientation to the cutting plane of the face mill 32. After the encasement 34 is mounted as desired to the support 40, the support 40 will be attached to the mounting block 78 using conventional techniques such as screws 120, which are best seen in FIG. 4, as indicated at 210.

The encasement process may be made more effective by further limiting the presence of voids in the hardening encasing material 38. In some encasement processes, voids are left in the encasing material 38. Particularly troublesome are voids adjacent the surface of the object 36 that is being encased, since such voids could be interpreted wrongly as a part of the object 36.

It has been found that to more effectively limit voids in the encasing material 38, a vacuum chamber 310 may be used. The vacuum chamber 310 is best shown in FIG. 19. The object 36 is encased in encasing material in the normal fashion. Following this, or during the encasement process, the object and encasement are placed in vacuum chamber 310. While in vacuum chamber 310, the object 36 and encasing material 38 are subjected to alternating cycles of high and low pressure during the curing phase of the encasing process. The cycling high and low pressures are used for a preferred period of approximately 20 minutes, although longer cycles may be used. The ultimate determination of the cycle time will be determined largely by the curing time of the encasement material 38. Similarly, the time at which vacuum chamber 310 is held at high and low pressure is variable.

The high and low pressure values used during the curing process are approximately sixty pounds per square inch and near vacuum, respectively. The high and low pressures are alternated throughout the curing period. The high and low pressure cycles are repeated at intervals of approximately two minutes, followed by a final high pressure curing period of approximately ninety minutes. This high pressure curing time may also be adjusted depending on the encasement material 38 to be used.

As has been mentioned, the curing period will be dependent on the type of encasing material 38 used for the encasement process. For example, when encasing large objects 36, it may be necessary to begin the curing stage of the encasement process before the part or object 36 is fully covered with encasing material 38. When this is the case, the high and low pressure cycling may be performed throughout the encasement process, which may take 24 hours or more.

All functions relating to the curing process may be performed by software controlling the appropriate functions.

After the encasement 34 and support 40 have been attached to the mounting block, various physical parameters of the encasement will be obtained, including the height, length and width of the encasement, as well as its weight as indicated at 212. This step may be taken if desired before the encasement is mounted to the machinable support at 206. The weight of the encasement 34 is important since this factor will enter into the acceleration and deceleration of the shuttle table 76. This information will be entered into computer 214 (FIG. 8) or like computational means containing an appropriate microprocessor. The feed speed, that is, the rate at which the shuttle table 76 is translated in the x-direction into the face mill 32 for contour removal, is determined and entered into computer 214 as indicated at 216. The feed speed will vary depending principally on the material out of which the object 36 is manufactured. For harder materials, such as steel, aluminum, and other metals, the feed speed will be less than where the object is manufactured of, say, a synthetic material such as nylatron. Other operational parameters will be determined, such as the desired contour thickness as indicated at 218 and the scan pixel density as indicated at 220, and will be entered into computer 214.

With the foregoing information, the computer 214 can begin material removal and data acquisition according to a previously arranged program. Thus, referring now to FIGS. 7 and 8, the computer 214 will send the appropriate signals to the z-drive motors 98 for rodless cylinders 88 and 90 over the appropriate communication link 222. These signals will thereby cause the screws 94 in cylinders 88, 90 to rotate and carry the shuttle table 76 and, more specifically, rodless cylinder 64 downwardly to its z-home position as shown in FIG. 1 and as indicated at 224 in FIG. 7A-1. As the rodless cylinder 64 is lowered, flag 112 will break a light beam generated by the z-motion sensor 108, thus providing a signal to computer 214 over an appropriate communication link 226 that the rodless cylinder 64 has reached its home position. The computer 214 will then provide the appropriate signal to z-drive motors 98 to stop.

The computer will next send a signal over an appropriate communication link 228 to x-drive motor 72 to cause the shuttle table 76 to be translated in the x-direction to its x-home position as indicated at 230 as indicated at FIG. 7A-2. Once again, as the shuttle table 76 approaches the x-home position, flag 110 will break a beam produced by x-motion sensor 106, thereby providing a signal to computer 214 over an appropriate communication link 232. Computer 214 will then send the appropriate signal to x-direction motor 72 over communication link 228 to stop, thus ceasing the translation of the shuttle table 76 in the x-direction.

Using the encasement dimensions previously supplied at 212, the computer 214 may determine an encasement specific predefined pre-cutting position in the x-direction, or if desired, such a pre-cutting position in the x-direction can be defined once for all objects. The computer 214 will then send the appropriate signal to x-direction motor 72 to move the shuttle table 76 to the predefined pre-cutting position as indicated at 234. The computer 214 will then command the operation of the z-drive motors to raise the shuttle table 76 to a z-cutting height as indicated at 236. Like the pre-cutting position in the x-direction, this z-cutting height can be calculated based upon the height of the encasement entered into the computer 214 as indicated at 212, or it can be established for all encasements. Preferably, this height should be such that the topmost portion of the encasement 34 is near the cutting plane defined by the rotation of the cutting inserts 44 of face mill 32. It is preferable that the encasement 34 be disposed too low such that no material be removed from the encasement on the first and subsequent passes through the face mill 32 than it is to have the encasement disposed too high and remove too thick a contour of material. Removing too thick a contour on the first pass could result in the loss of object geometry and/or overload the face mill 32 and perhaps cause a mechanical breakdown of the mill.

When the shuttle table 76 is in the predefined, pre-cutting position in both the x- and z-directions, computer 214 will send a signal over an appropriate communication link 238 to face mill motor 52, commanding the motor 52 to start the rotation of the cutting head 42 as indicated at 240. When the cutting head 42 is rotating at the desired speed, the computer will then again command the x-direction drive motor 72 to translate shuttle table 76 and attached encasement 34 into face mill 32 at the predetermined feed speed, as indicated at 242. Mill 32 will remove an initial contour of material to expose a surface C1 as seen in FIG. 6.

After removal of the initial layer of material from the encasement 34, the shuttle table 76 will be lowered by the appropriate command from computer 214 to z-drive motors 98 as indicated as 244. The shuttle table 76 will then be translated in the x-direction to the x-home position as indicated at 246. During this translation, as the shuttle table 76 nears the x-home position it will pass a Hall-effect switch (not shown) that will provide a signal to the computer 214 that the shuttle table 76 is near the home position. The computer 214 will then decelerate the shuttle table 76 so that it is translating at a slow rate of speed. As the shuttle table 76 "enters" the x-home position, flag 110 will break the light signal generated by x-sensor 106. Sensor 106 will provide a signal to computer 214 which will in turn command the x-drive motor 72 to stop. Computer 214 may then command the x-drive motor to reverse and slowly back the shuttle table 76 away from the x-home position until flag 110 no longer breaks the light signal of sensor 106. Translation in the x-direction will then cease and the shuttle table 76 will be brought to an immediate stop. In this way it will be possible to repeatedly and reliably position the shuttle table 76 and the encasement 34 in the same x-position after each material removal pass.

The computer 214 will next command the z-drive motors to raise the shuttle table 76 until the exposed surface C1 is substantially flush with the glass of the scanner 114 as indicated at 248. Computer 214 will then command scanner 114 over an appropriate communication link 250 to scan the newly exposed surface as indicated at 252. After the scanning is complete, the shuttle table 76 will be lowered as indicated at 254 and the cycle repeated from step 234, with successive contours of encasement being removed, such as layers C2–C7 as shown in FIG. 6, with the thickness of each contour being determined at step 218. Thus, as the shuttle table 76 is raised into cutting height with each pass, the thickness of the material removed on the previous pass will be added to the last height of the shuttle table so that the face mill consistently removes the same thickness of material. This cycle of material removal and scanning will continue until the face mill 32 has completely milled away the encasement 34. With the example shown in FIGS. 5 and 6, object 36 has a substantially planar upper surface, thus necessitating the removal of several contours, specifically C1–C5, before any object material is removed. It will be seen that as contour C6 was removed, a layer of material 256 was removed and that as contour C7 was removed, a layer of material 258 was removed, each removal exposing a surface to be scanned.

Figure 9:
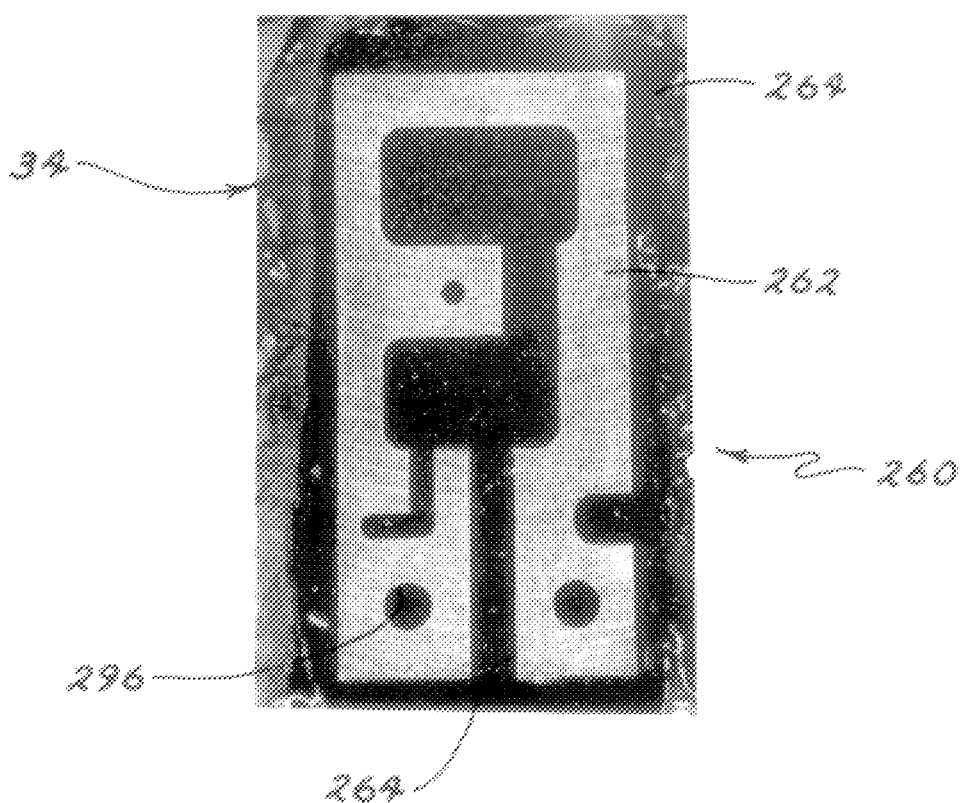
FIG. 9 is a photograph of actual scanned image of an exposed surface of an illustrative encasement.
Figure 10:
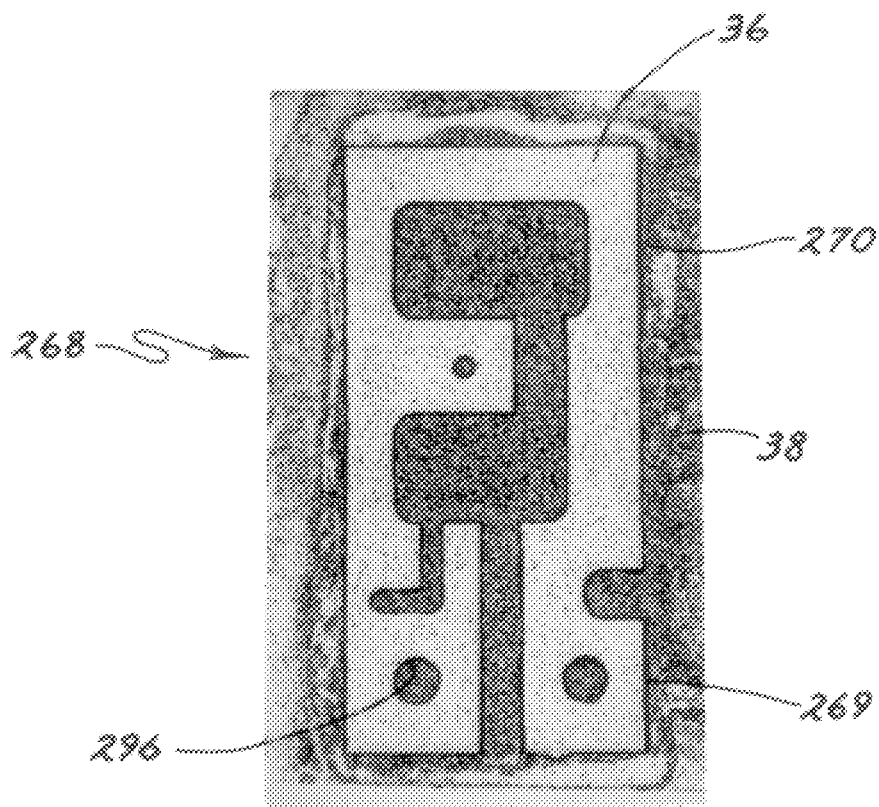
FIG. 10 is a photograph of an actual image of a data file after an edge detection process has been applied to the scanned image of FIG. 9.

Referring now to FIGS. 7B and 9–15, the processing of the scanned images of the exposed surfaces of encasement 34 will be described. It will be understood that the thickness of the contour removed with each pass through the face mill 32 can be precisely controlled such that a contour having a thickness as small as 0.001 inch can be removed. It will be further understood that if desired, a series of passes can be made through the face mill 32 before a particular exposed surface is scanned by scanner 114. Or if desired, a scan can be made after each pass and each scan or only selected scans can be further processed as described further herein. FIG. 9 shows a photocopy of an actual scanned image 260 like that produced by commercially available scanners such as scanner 114. Image 260 shows the exposed surface 262 of the object 36 and the exposed surface 264 of the encasing material, the geometry of this particular representative object 36 perhaps best being understood by viewing FIGS. 5 and 6 in conjunction with FIG. 9. Scanned image 260 is processed as indicated at 266 in FIG. 7B to define the edges of the object 36, thus yielding image 268 as shown in FIG. 10, where the perimeter of the object 36 is indicated with reference numeral 269. This process, known in the art as "edge find" can be accomplished by a commercially available software package sold by Micrografx under the Designer trademark. This process creates a raster curve over areas of visual contrast, such as that found between the exposed surfaces 262 and 264 of object and encasing material, respectively, and succeeds in defining an edge 270 that delineates the boundary of visual contrast between the object 36 and the encasing material 38.

Figure 11:
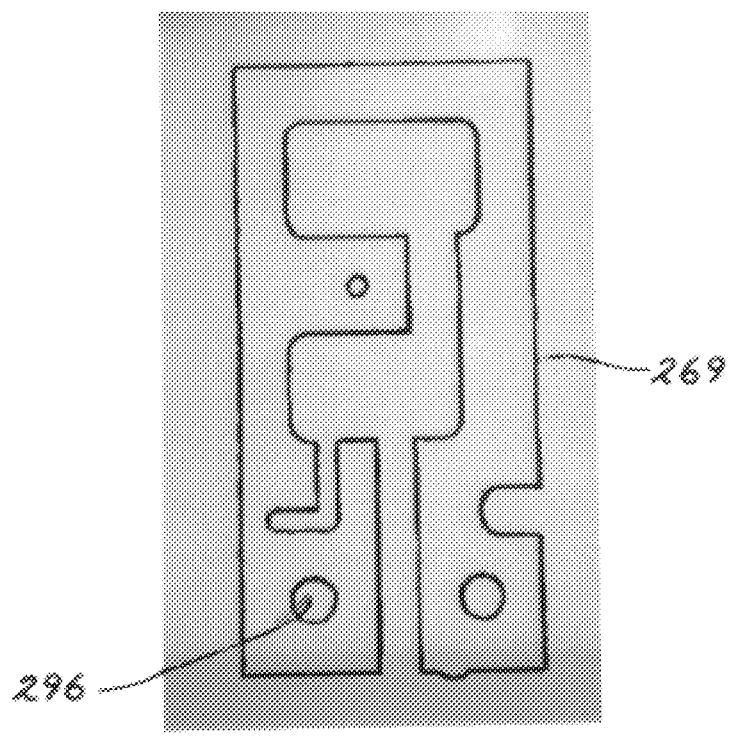
FIG. 11 is a photocopy of an actual line art image created by further processing of the image shown in FIG. 10.

The "edge find" image 268 can then be processed as indicated at 272 to produce a line art image 274 as seen in FIG. 11. This process can also be accomplished by the Designer software. This process removes all shades of gray, as can be seen by comparing FIGS. 9 and 10 with FIG. 11, and produces a simple black and white image of raster lines and curves.

Figure 12:
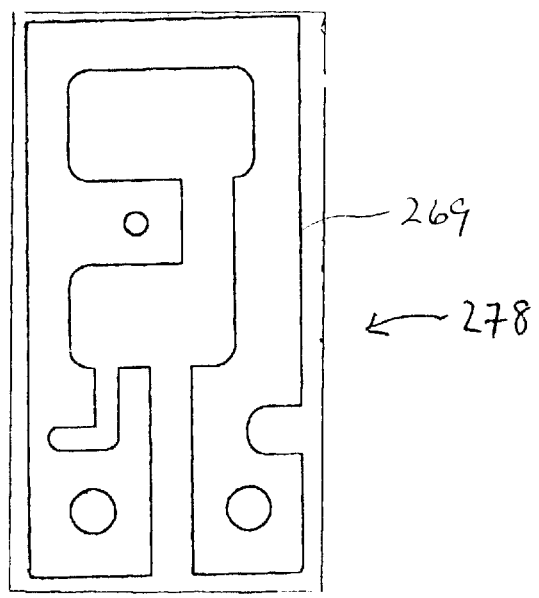
FIG. 12 is a photograph of an actual filtered line art image created by further processing of the image shown in FIG. 11.

The line art image 274 can be further processed as indicated at 276 to produce a filtered line art image 278 as seen in FIG. 12. This process functions to filter out noise and to retain only legitimate features of the original image such as the edges. During this process the features of one image are compared with those above and below it on the z axis. Noise will not generally appear at the same location from one image to the next and will be filtered out of the image by the software. As can be seen by comparing images 274 and 278 of FIGS. 11 and 12, respectively, filtered line art image 278 is much "cleaner" than is line art image 274.

Figure 7B:
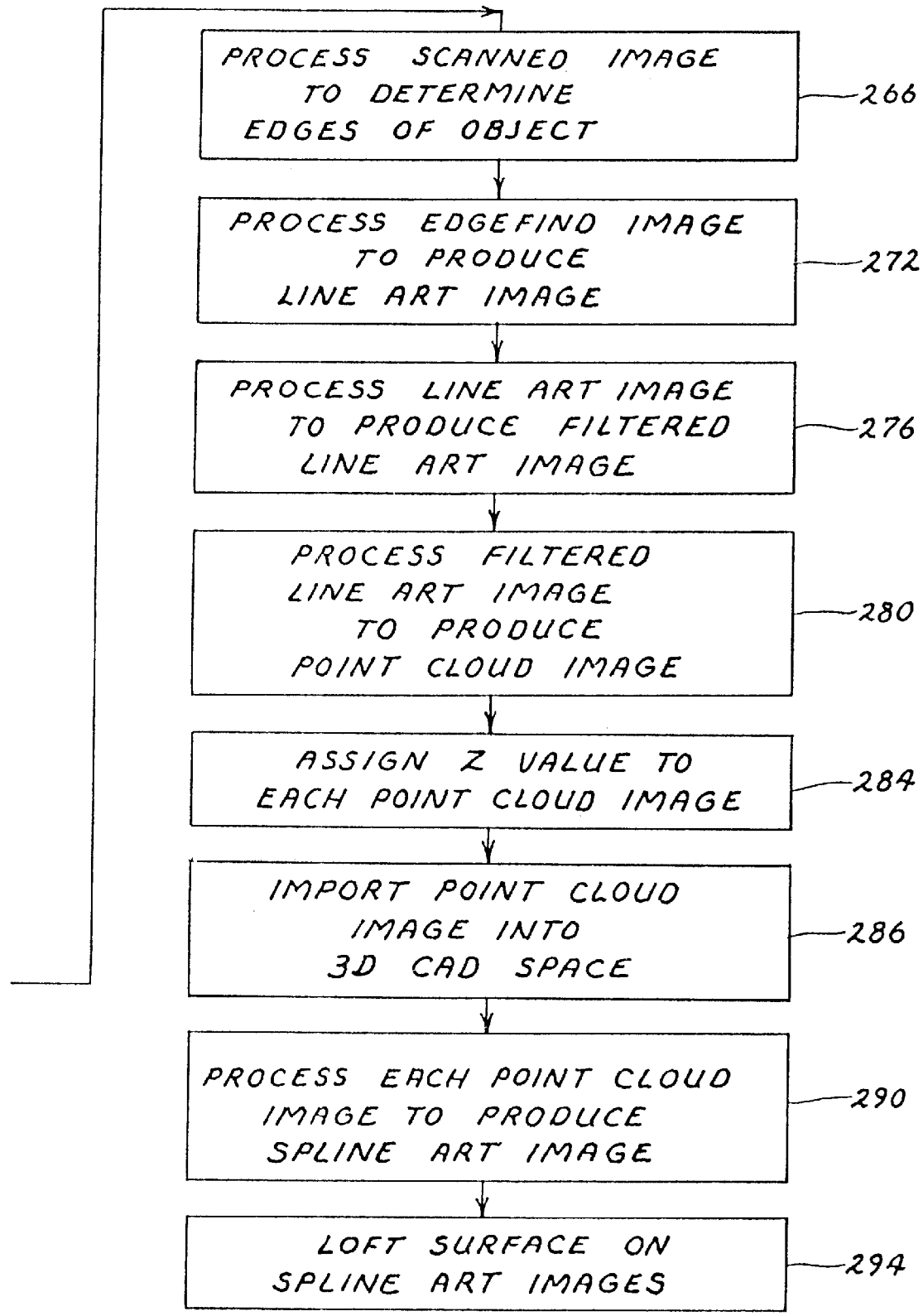
FIG. 7B is a flow chart illustrating the processing of the data obtained using apparatus in accordance with the present invention for surface modeling of the object.
Figure 8:
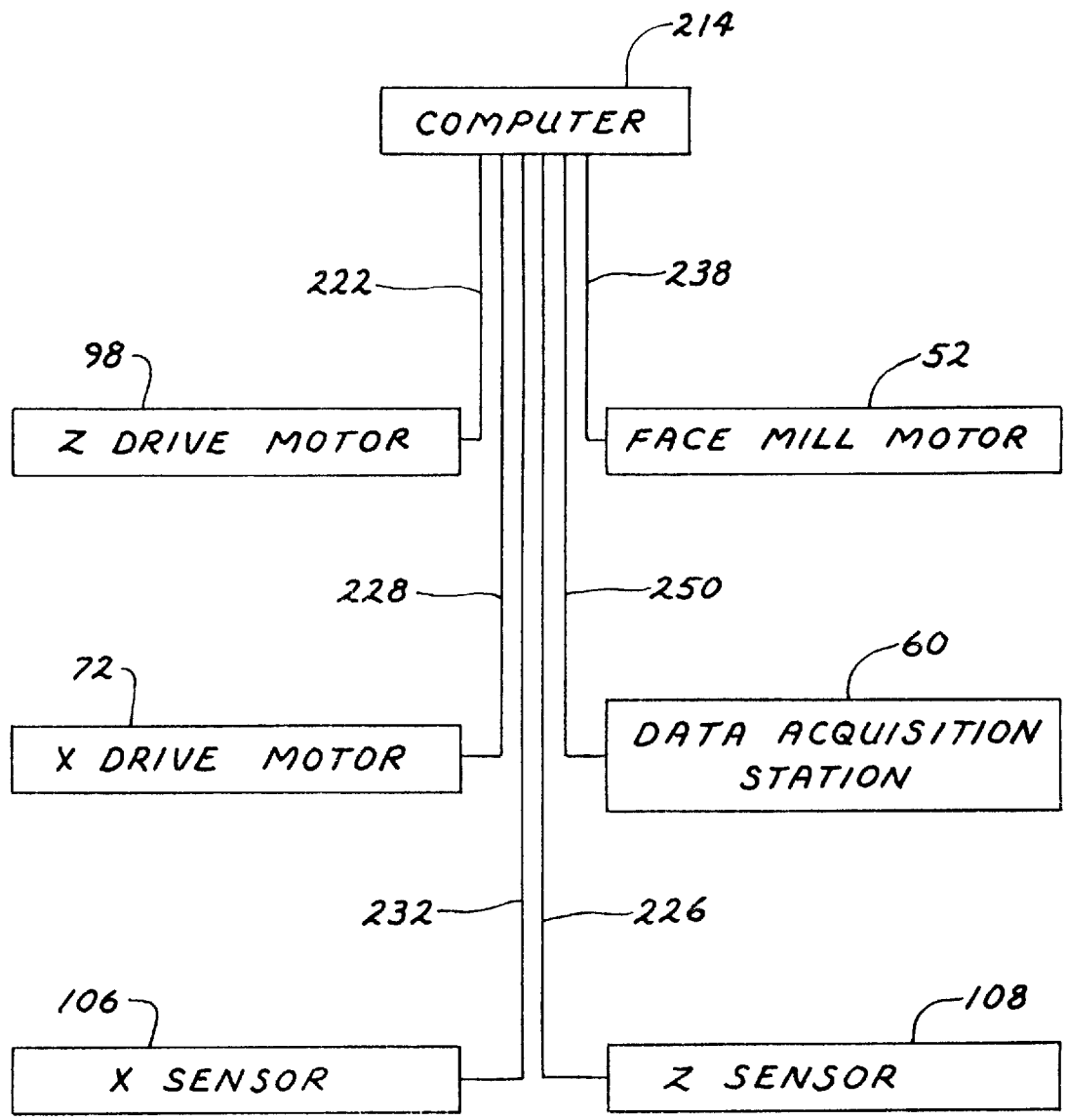
FIG. 8 is a schematic diagram illustrating the control system for the present invention.
Figure 13:
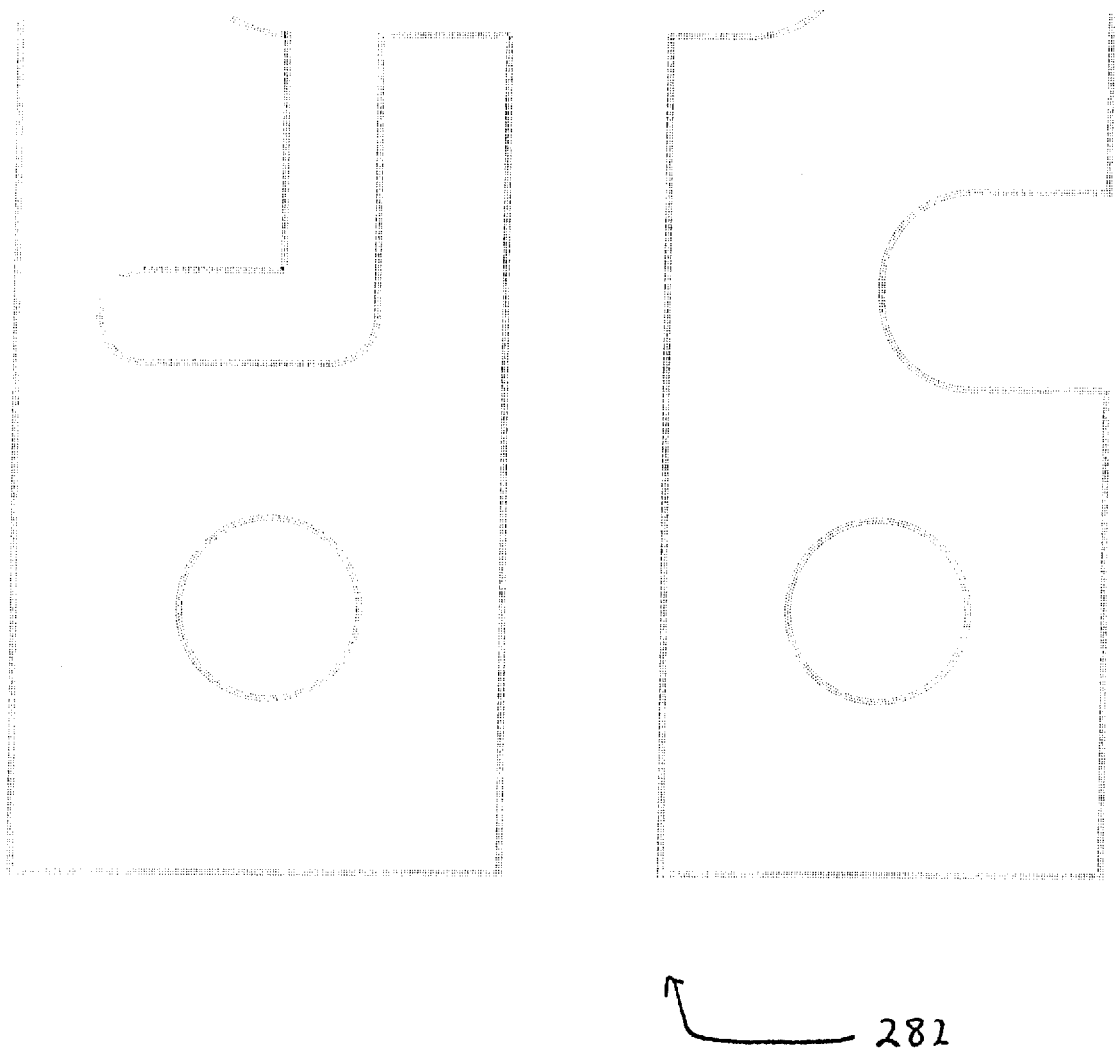
FIG. 13 is a photocopy of an actual top plan view of a portion of a point cloud created from the image shown in FIG. 12.

Referring now to FIGS. 7B and 13, the processing of the scanned images will be further explained. Thus, the filtered line art image 278 will be processed as indicated at 280 in FIG. 7B to produce a point cloud image 282 as seen in FIG. 13 in an enlarged view. During this process, as will be understood, the filtered line art image comprises a raster image formed of pixels. These pixels each define an area. The line art image to cloud point image involves converting each of the pixels to a point having a defined position in xy space. Stated otherwise, this process is a raster to vector transformation process and in well known computer language involves converting a raster file in a format known as TIFF to a vector file known as DXF. This conversion can be accomplished by the Designer software package sold by Micrografx. The previously discussed image processing steps can also be performed by software available for Aldus.

Figure 14:
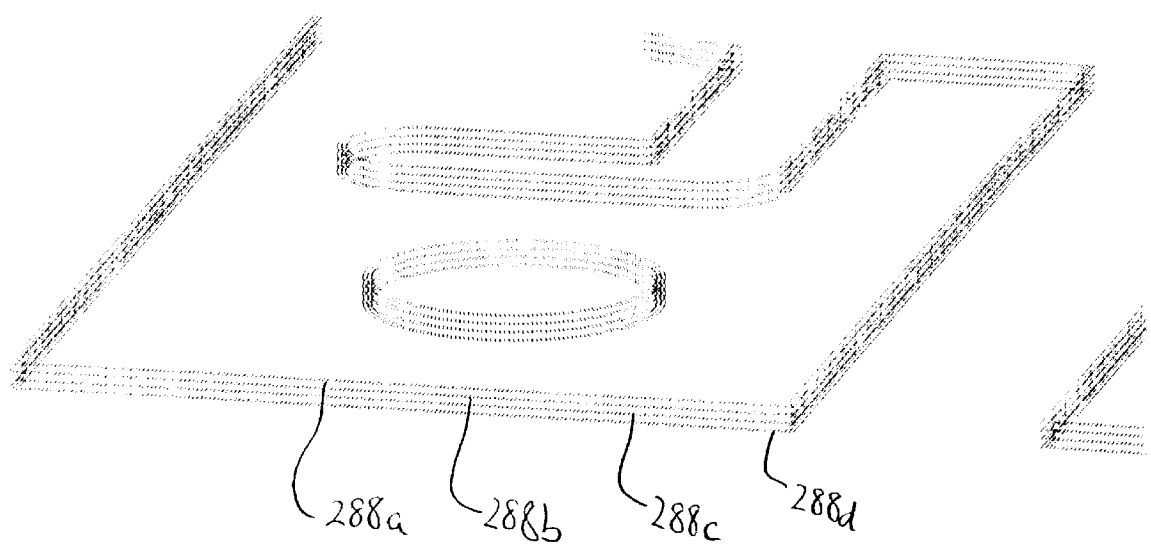
FIG. 14 is a photocopy of an actual image of a plurality of layers of point clouds in three dimensional CAD space created from successively exposed surfaces.

The next step in the data processing process will involve assigning a z-value to each point in the point cloud layer such that each point is now located in xyz space, as indicated at 284. This "assignment" of z-values is necessary since as the exposed surface of the encasement 34 is scanned, a two dimensional image in xy space is created. Without the associated z-values, the images would exist in a single plane in CAD space. There is no inherent data representative of the elevation of the particular exposed encasement surface as a result of the scanning. This information will be associated with the scanned image by information provided by a pulse counter (not shown in the Figures) associated with the z-drive motor. The count from the pulse counter is secured at the time each scan is made and is retained to identify the z-value or elevation of that particular scan. The point cloud layer images are then imported into CAD space as indicated at 286. This process can be accomplished by a commercially available software package sold by Imageware of Ann Arbor, Mich., under the Surfacer trademark. Each imported point cloud layer images represents a particular exposed surface of the object 36. The layer images can then be "stacked" one upon the other in CAD space as indicated by FIG. 14, which shows four such layers, 288a, 288b, 288c and 288d.

Figure 15:
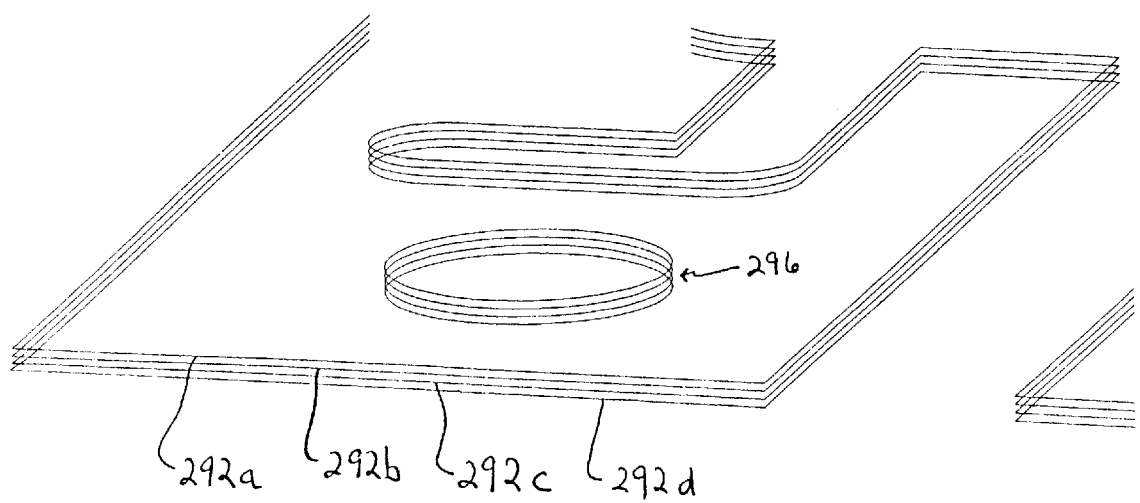
FIG. 15 is a photocopy of an actual image of a portion of a spline art drawing created from the layers of point clouds shown in FIG. 14.

The point cloud layers can then be processed to produce a spline art image. This can be accomplished with the aforementioned Surfacer software package and involves fitting curves—called splines—of predefined length through the points in each point cloud layer as indicated at 290 and as shown in FIG. 15 wherein layers 288a–d have been processed to produce layers 292a, 292b, 292c, and 292d, respectively, thus effectively defining the perimeter edge of the object 36 within each layer.

Figure 16:
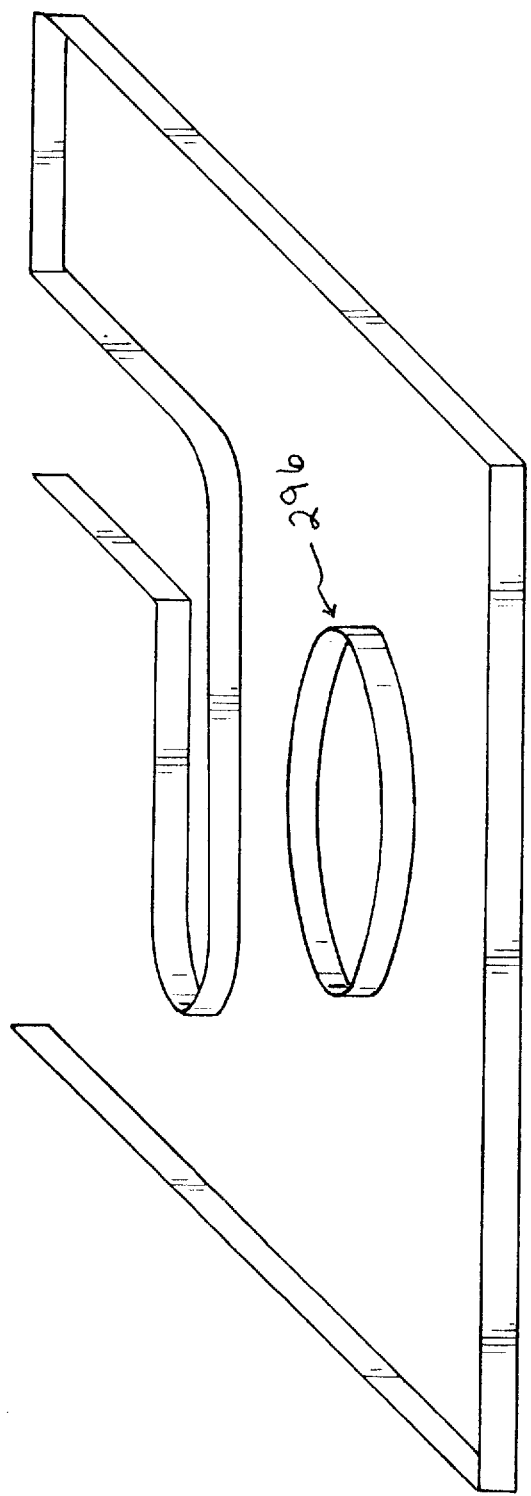
FIG. 16 illustrates the lofting of a surface on the plurality of layers of the spline art drawing shown in FIG. 15.

The final step as indicated at 294 involves lofting a surface on the stack of spline art layers to produce a surface model such as that shown in FIG. 16. This process can also be accomplished with the Surfacer software package as well as others that are commercially available. The resulting surface model includes the external features of the object as well as the much desired internal features, such as the hole 296 shown in FIG. 16. Where the removed contours have a thickness of, say 0.010 inch, and where each exposed surface is scanned, the layers shown in FIG. 15 and the surface shown in FIG. 16 will have a depth substantially equal to 0.030 inch. It will be understood that the foregoing representations show several stacked data layers whose thickness is determined by the thickness of the layers of material removed with each pass through the material removal means as well as the scanning frequency, that is, whether a scan is made with each cutting pass through the encasement 34 and whether each scan is in fact processed as part of the object reconstruction in CAD space.

Figure 7C:
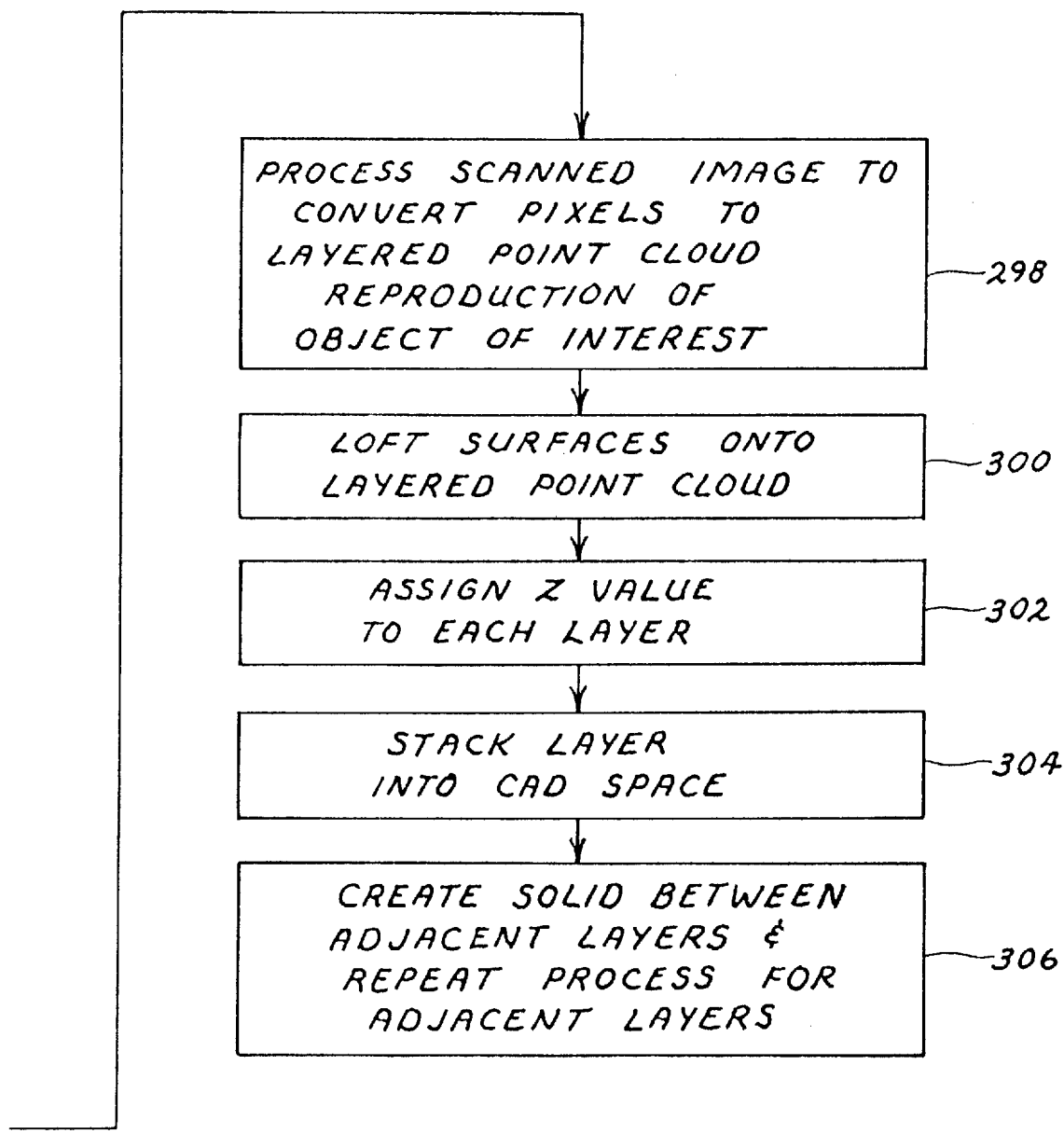
FIG. 7C is a flow chart illustrating the processing of the data obtained using the present invention for solid modeling of the object.

Alternatively to producing a surface model of the object of interest, the scanned images can be processed to produce a solid model in three dimensional CAD space. Referring now to FIG. 7C, this process will be described. The first step of this process will involve processing the scanned images to convert the pixel data produced by the scans into layered point clouds representative of the object of interest as indicated at 298. From there, a surface will be lofted onto each point cloud layer, as indicated at 300. A z-value will be assigned to each layer as indicated at 302. The layers can then be imported into CAD space and stacked as indicated at 304. As a final step as indicated at 306, a solid will be created between two adjacent layers and the process will be repeated until a solid is formed between all adjacent layers.

Figure 17:
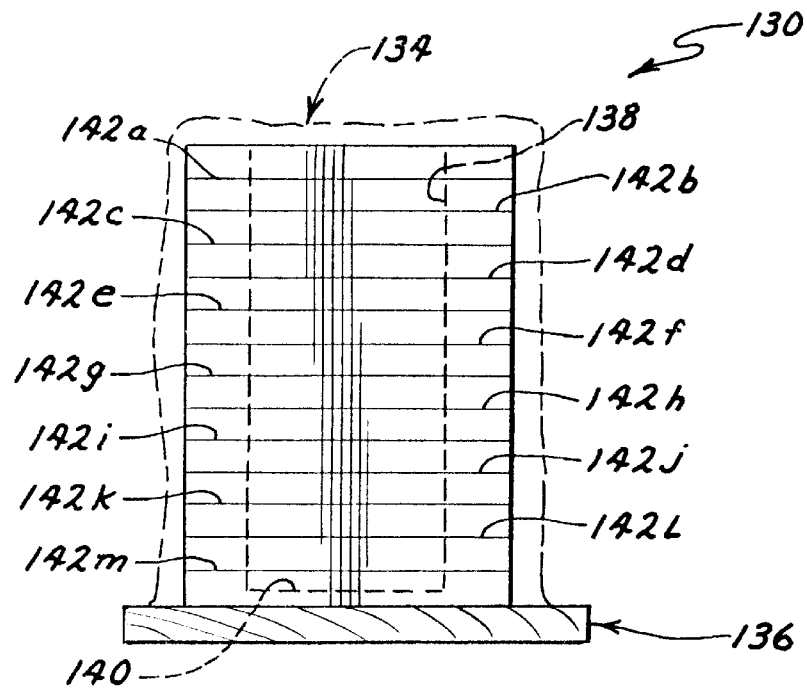
FIG. 17 shows an encased object mounted for material removal with a plurality of contours of removed material being indicated.
Figure 18:
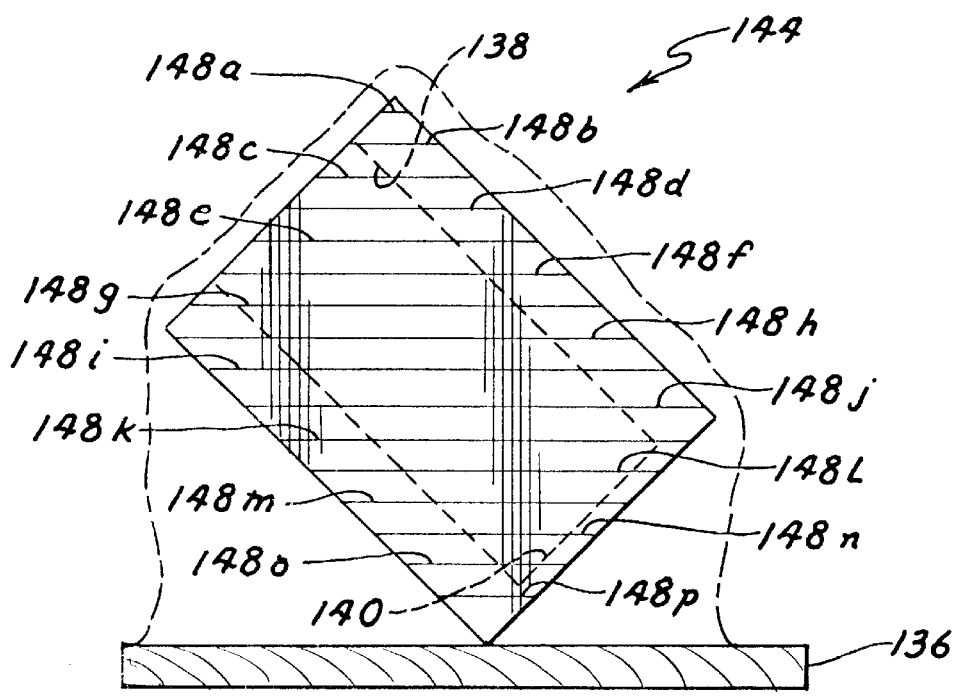
FIG. 18 illustrates a preferred orientation of the object shown in FIG. 16 relative to the surfaces to be exposed to increase the data gathered on a feature of interest.

Referring now to FIGS. 17 and 18, a method of orienting the object of interest relative to the cutting plane of the material removal means will be discussed. With certain objects, there may be a particular feature whose position within the object is very important to determine precisely. Thus, as seen in FIG. 17, an encasement 130 comprising an object of interest 132 encased within an encasing material 134 and mounted to a machinable support 136 is shown. Object 132 includes a hole 138 extending partially therethrough. Hole 138 has a bottom surface 140. Many objects have a somewhat orthogonal configuration that naturally leads to mounting the object squarely on the machinable support in much the same manner that object 132 is shown mounted in the Figure. Also shown in the Figure are the various surfaces 142a–m of the object that will be exposed as a result of the material removal process. It can be seen that bottom surface 140 of hole 138 lies substantially parallel to the exposed surfaces. Thus, by orienting the object 132 in the fashion shown wherein a planar surface of interest is disposed parallel with the cutting plane of the material removal means, information as to the true depth of the hole 138 will be lost since the removal of the contour that exposes surface 142m will not reach the bottom 140 and removal of the final contour of material will also result in removal of the feature.

Referring now to FIG. 18, a preferred orientation for an object having a feature of interest is shown. Thus, an encasement 144 comprising an object 132 encased within an encasing material 146 and mounted to a machinable support 136 is shown. Also indicated in the Figure are the successively exposed surfaces 148a–p. With the orientation of object 132 within encasing material 146 as shown, the feature of interest, that is, hole bottom 140, is oriented such that its planar bottom lies at an angle to the exposed surfaces 148*a–p*; that is, it lies at an angle to the cutting or material removal plane of the material removal means. With this orientation, information regarding the depth of hole 138 within object 132 is revealed by successively exposed surfaces 148*j–p*. With this many exposed surfaces defining the hole bottom 140, the aforementioned data manipulation process can accurately reproduce the feature of interest at the correct location within the part. Thus, where an object to be modeled by the present invention includes a particular feature of interest, the object should be oriented such that it lies at an angle to the material removal plane of the material removal means.

The foregoing description of the present invention thus contemplates the successive removal of layers of material of predetermined thickness from an object. The thickness of the removed material may be as small as the material removal means is capable. The present invention contemplates scanning selected exposed surfaces. All such surfaces may be scanned if desired. The present invention further contemplates that successive passes through the material removal means wherein varying thicknesses of material are removed with each pass. For example, where it is desired to scan an exposed surface at every 0.01 inch and to construct a model from such scans, a plurality of passes through the material removal means may be made wherein a first pass might remove a contour having a thickness of, say, 0.006 inches, a second pass might remove a contour having a thickness of, say, 0.003 inches, and a third and final pass might remove a contour having a thickness of, say, 0.001 inch for a total thickness of material removed of 0.01 inch. Furthermore, preselected surface scans of specific z-values may be scanned and analyzed. That is, it may be easily and readily recognized that through a certain portion of an encasement that scans every 0.01 inch, for example, would be sufficient but that in other portions it would be desirable to scan every 0.005 inch, for example. In such a circumstance the apparatus could be set up to remove contours having a thickness of 0.005 inches throughout the encasement while scanning at 0.005 inches only in the latter portion and at 0.01 inches in the remaining portion. Or each layer at 0.005 inches could be scanned but in the processing only those in the latter portion would be processed at 0.005 inches while in the former portion every other scan would be processed to yield layers 0.01 inch apart. Finally, the system could be configured to mill in the former portion at 0.01 inch and in the latter at 0.005 inch and all scans could be evaluated.

The present invention having thus been described, other modifications, alterations, or substitutions may now suggest themselves to those skilled in the art, all of which are within the spirit and scope of the present invention. For example, the encasing material could be dyed water or other similar low viscosity type of material. In this embodiment the object of interest would be immersed in the dyed water, which would then be frozen. The material removal would then occur in a cold system; that is, one maintained at such a temperature that the encasing material would be maintained in a frozen state. Such a process would provide several advantages, among them an assurance that internal voids would be filled, ease of object preparation, and that the residual waste products from the material removal operation would be non-toxic and easily cleaned up. Alternatively, the encasing material could comprise a form of matter that radiates, such as a phosphor, which would transmit its radiative signature, which may be visual, to the appropriate sensor designed to detect such radiation. The radiation provided by the encasing material would provide a high contrast between it and the object since the object would be non-radiating. It is therefore intended that the present invention be limited only by the scope of the attached claims below.

What is claimed is:

1. Apparatus for producing electronic data representations of an object, the object being formed from at least one material, said apparatus comprising:
   a material removal station;
   a data gathering station; and
   a shuttle providing relative movement of the object between said stations;
   wherein said material removal station comprises:
      means for removing a predetermined contour of material from the object;
   wherein said shuttle comprises:
      a table for holding the object; and
      means for providing relative movement of said table between said material removal station and said data gathering station; and
   wherein said data gathering station comprises:
      means for successively imaging the object after removal of a predetermined contour; and
      means for storing data gathered by said means for imaging; and
   wherein said table is thermally conductive.

2. An apparatus as described in claim 1, wherein said table is metal.

3. An apparatus as described in claim 1, and further comprising:
   a variable pressure chamber surrounding said shuttle, whereby the object may be subjected to varying pressures.

4. An apparatus described in claim 3, wherein the object is encased, while said shuttle is in said variable pressure chamber, within an encasing material to form an encasement and wherein the contour removing means removes a predetermined contour of the encasement.

5. An apparatus as described in claim 4, and further comprising:
   means for encasing the object in the encasing material without the object contacting said table.

6. A method for producing electronic data representations of an object having a plurality of surfaces, said method comprising:
   encasing the object within a preselected encasing material to form an encasement, such encasing being done so that all surfaces of the object are coated with the encasing material and so that the encasing material substantially fills all interior volumes of the object;
   removing a predetermined contour from the encasement so as to expose an encasement surface;
   acquiring an electronic representation of selected exposed encasement surfaces after a predetermined contour has been removed;
   processing each electronic representation to create a predetermined electronic representation of each said encasement surface; and
   curing said encasing material in a vacuum chamber in which a pre-determined pattern of high and low pressure cycles is used.

7. A method as described in claim 6, wherein the step of curing said encasing material comprises the steps of:
   lowering the pressure in the vacuum chamber to near vacuum, and raising the pressure in the chamber to high pressure, in a series of cycles for approximately 20 minutes; and finally curing said encasing material at high pressure for a pre-determined curing period.

8. A method as described in claim 7, wherein said pre-determined curing period is approximately 90 minutes.

9. A method as described in claim 7, wherein said high pressure is approximately 60 psi.

10. A method as described in claim 7, wherein the pressure in the chamber is alternated between high and low throughout the curing period.

11. A method as described in claim 7, wherein said curing is approximately 24 hours.

12. A method for creating a point-cloud representation of a physical object, comprising the steps of:

suspending the object above a base in a mold;

filling the mold with an encasing material to create an encasement;

placing the mold in a vacuum chamber;

curing the encasing material in the vacuum chamber at alternating high and low pressure for a pre-determined length of time;

removing the encasement from the mold;

removing a pre-determined contour of the encasement so as to expose an encasement surface;

acquiring an electronic representation of selective exposed encasement surfaces after a predetermined contour has been removed; and processing each electronic representation to create a pre-determined electronic representation of each said encasement surface.

13. A method as described in claim 12, wherein said curing step includes the steps of:

lowering the pressure in the chamber to near vacuum, and raising the pressure in the chamber to high pressure, in a series of cycles for approximately 20 minutes; and finally curing said encasing material at high pressure for a pre-determined curing period.

14. A method as described in claim 13, wherein said pre-determined curing period is approximately 90 minutes.

15. A method as described in claim 12, and further comprising:

cleaning the object before suspending the object above the base in a mold.

16. A method as described in claim 12, and further comprising:

measuring the length, width, and depth of the encasement after removing the encasement from the mold.

17. A method as described in claim 12, wherein the step of removing a pre-determined contour of the encasement includes choosing a thickness for the pre-determined contour to be removed.

18. Apparatus for producing electronic data representations of an object, the object being formed from at least one material, said apparatus comprising:

a material removal station;

a data gathering station; and a shuttle providing relative movement of the object between said stations;

wherein said material removal station comprises:

means for removing a predetermined layer of material from the object;

wherein said data gathering station comprises:

means for successively imaging the object after removal of a predetermined layers; and means for storing data gathered by said means for imaging; and wherein said shuttle comprises:

a thermally conductive table for holding the object;

means for moving said table in a first substantially linear direction between a first position in which said table is at said data gathering station in imaging alignment with said means for successively imaging the object, and a second position in which said table is at said material removal station in material removing alignment with said means for removing a layer of material;

a first sensor for determining when said table is at said data gathering station in imaging alignment with said means for successively imaging tile object;

means for moving said table in a second direction substantially perpendicular to said first direction into and out of relative material removing engagement with said means for removing a predetermined layer of material; and a second sensor for determining when said table is at said material removing station in relative material removing engagement with said means for removing material.

* * * * *